US009500925B2

(12) United States Patent
Lin et al.

(10) Patent No.: US 9,500,925 B2
(45) Date of Patent: Nov. 22, 2016

(54) TRI-STATE LIQUID CRYSTAL DISPLAY PANEL

(71) Applicant: AU Optronics Corp., Hsin-Chu (TW)

(72) Inventors: Tzu-Chieh Lin, Hsin-Chu (TW); Chen-Chun Lin, Hsin-Chu (TW); Tien-Lun Ting, Hsin-Chu (TW); Wen-Hao Hsu, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 67 days.

(21) Appl. No.: 14/231,767

(22) Filed: Apr. 1, 2014

(65) Prior Publication Data

US 2014/0293178 A1    Oct. 2, 2014

(30) Foreign Application Priority Data

Apr. 1, 2013    (TW) .............................. 102111755 A

(51) Int. Cl.
*G02F 1/1362* (2006.01)
*G02F 1/137* (2006.01)
*G02F 1/1343* (2006.01)

(52) U.S. Cl.
CPC ........... *G02F 1/137* (2013.01); *G02F 1/13624* (2013.01); *G02F 1/134363* (2013.01); *G02F 2001/13756* (2013.01); *G02F 2001/13775* (2013.01); *G02F 2001/134372* (2013.01); *G02F 2001/134381* (2013.01)

(58) Field of Classification Search
CPC .............. G02F 1/134363; G02F 2001/134381; G02F 2001/133531; G02F 1/13624
See application file for complete search history.

(56) References Cited

U.S. PATENT DOCUMENTS

| 5,532,852 A | * | 7/1996 | Kalmanash | .................... 349/117 |
| 7,307,675 B2 | | 12/2007 | Abileah | |
| 8,179,485 B2 | | 5/2012 | Tsai | |
| 8,179,512 B2 | * | 5/2012 | Sato | .................. G02F 1/134363 349/141 |

(Continued)

FOREIGN PATENT DOCUMENTS

| TW | 200527059 | 8/2005 |
| TW | 200632408 | 9/2006 |

(Continued)

*Primary Examiner* — Richard Kim
*Assistant Examiner* — Kendrick Hsu
(74) *Attorney, Agent, or Firm* — WPAT, PC; Justin King

(57) ABSTRACT

A tri-state liquid crystal display panel includes a first substrate, a second substrate, a liquid crystal layer, a first electrode, a second electrode, a third electrode and a fourth electrode. The first substrate and the second substrate are disposed oppositely. The liquid crystal layer disposed between the first substrate and the second substrate includes a plurality of polymer network liquid crystals. The first electrode is disposed between the first substrate and the liquid crystal layer, the second electrode is disposed between the second substrate and the liquid crystal layer, and the first and second electrodes include planar electrodes. The third and fourth electrodes are disposed between the first substrate and the liquid crystal layer, and the third and fourth electrodes include patterned electrodes. The tri-state liquid crystal display panel has a transmission state display mode, a dark state display mode and a haze state display mode.

14 Claims, 26 Drawing Sheets

(56) References Cited

U.S. PATENT DOCUMENTS

| | | |
|---|---|---|
| 2006/0203147 A1 | 9/2006 | Chen |
| 2006/0203169 A1 | 9/2006 | Ozawa |
| 2006/0227283 A1 | 10/2006 | Ooi |
| 2007/0024822 A1 | 2/2007 | Cortenraad |
| 2008/0180605 A1* | 7/2008 | Kim ................ 349/96 |
| 2010/0103085 A1* | 4/2010 | Lee .............. G02F 1/134363 345/92 |
| 2012/0249928 A1* | 10/2012 | Kaihoko et al. ............ 349/69 |
| 2012/0286201 A1 | 11/2012 | Ikenaga |
| 2015/0212377 A1* | 7/2015 | Imaoku et al. ............. 349/42 |

FOREIGN PATENT DOCUMENTS

| | | |
|---|---|---|
| TW | 200732741 | 9/2007 |
| TW | 201120518 | 6/2011 |

* cited by examiner

TRI-STATE LIQUID CRYSTAL DISPLAY PANEL

BACKGROUND OF THE INVENTION

1. Field of the Invention

The present disclosure relates to a tri-state liquid crystal display panel, and more particularly, to a liquid crystal display panel with a transmission state display mode, a dark state display mode and a haze state display mode.

2. Description of the Prior Art

With the advantages of light, small size and more energy efficient, liquid crystal display panels have been widely used in all kinds of electronic products, for example, a smart phone, a notebook, and a tablet PC. As the technology of large-size liquid crystal display panels has evolved rapidly, the liquid crystal display panels now occupy the greatest proportion of the entire display market. However, the current liquid crystal display panels only have two display modes, which are the transition state display mode and the dark state display mode, and thus can hardly ensure both display and privacy functions at the same time. Accordingly, the applications of the liquid crystal display panel are rather limited.

SUMMARY OF THE INVENTION

It is one of the objectives of the disclosure to provide a tri-state liquid crystal display panel to expand the applications of the liquid crystal display panel.

An embodiment of the disclosure provides a tri-state liquid crystal display panel includes a first substrate, an insulation layer, a second substrate, a liquid crystal layer, a first polarizer, a second polarizer, a first electrode, a second electrode, a third patterned electrode and a fourth patterned electrode. The insulation layer is disposed on the first substrate. The first substrate is disposed to face the second substrate. The liquid crystal layer is disposed between the first substrate and the second substrate. The liquid crystal layer includes a plurality of polymer network liquid crystals. The first polarizer is disposed on the first substrate and has a first polarization axis. The second polarizer is disposed on the second substrate and has a second polarization axis. The first electrode is disposed between the first substrate and the insulation layer. The first electrode comprises a planar electrode. The second electrode is disposed between the second substrate and the liquid crystal layer. The second electrode comprises a planar electrode. The third patterned electrode is disposed between the insulation layer and the liquid crystal layer. The third patterned electrode comprises a patterned electrode. The fourth patterned electrode is disposed between the insulation layer and the liquid crystal layer. The fourth patterned electrode comprises a patterned electrode. The tri-state liquid crystal display panel has a transmission state display mode, a dark state display mode and a haze state display mode.

With polymer network liquid crystals and four independently-controllable electrodes, the tri-state liquid crystal display panel in the present disclosure alternatively provides three display modes, which are the transmission state display mode, the dark state display mode and the haze state display mode, with horizontal electric fields or vertical electric fields or without any electric field, thereby significantly expanding the applications of the liquid crystal display panel.

These and other objectives of the present disclosure will no doubt become obvious to those of ordinary skill in the art after reading the following detailed description of the preferred embodiment that is illustrated in the various figures and drawings.

DETAILED DESCRIPTION

To provide a better understanding of the present disclosure, features of the embodiments will be made in detail. The embodiments of the present disclosure are illustrated in the accompanying drawings with numbered elements. In addition, the terms such as "first" and "second" described in the present disclosure are used to distinguish different components or processes, which do not limit the sequence of the components or processes.

Figure 1:
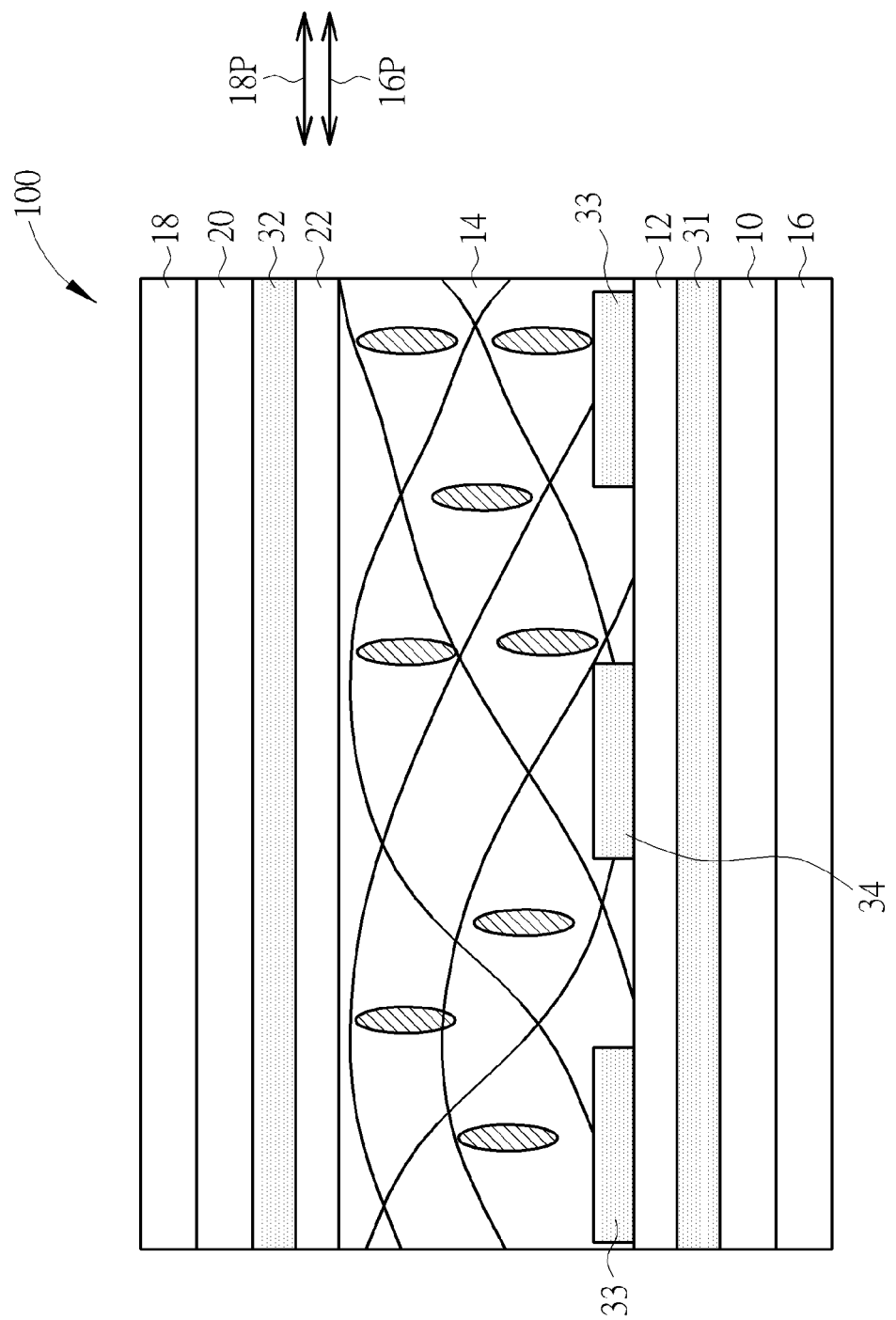
FIG. 1 is a cross-sectional view schematic diagram illustrating a tri-state liquid crystal display panel according to the present disclosure.
Figure 2:
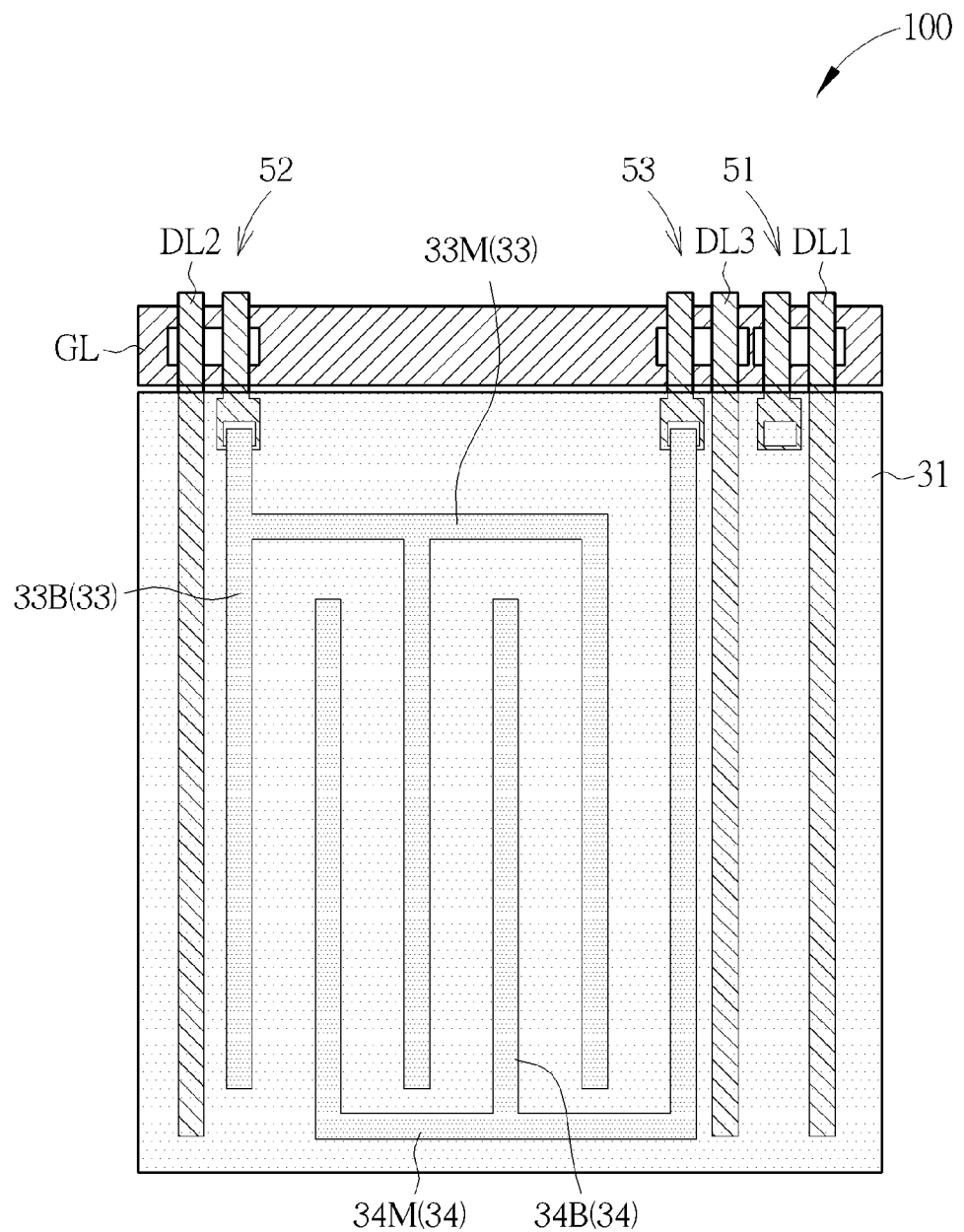
FIG. 2 is a top-view schematic diagram illustrating the tri-state liquid crystal display panel according to the present disclosure.
Figure 5:
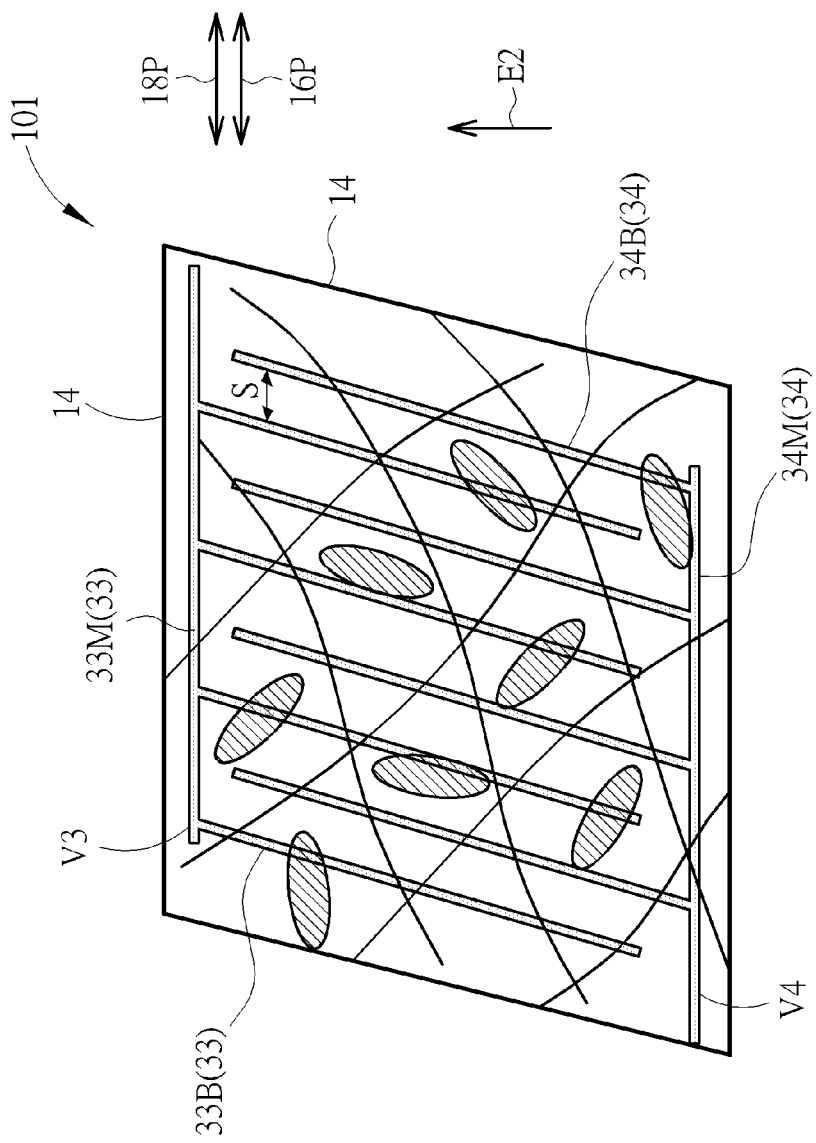
FIG. 5 is a schematic diagram illustrating the tri-state liquid crystal display panel under the haze state display mode according to the first embodiment of the present disclosure.

Please refer to FIGS. 1-2. FIG. 1 is a cross-sectional view schematic diagram illustrating a tri-state liquid crystal display panel according to the present disclosure. FIG. 2 is a top-view schematic diagram illustrating the tri-state liquid crystal display panel according to the present disclosure. To highlight the feature of the tri-state liquid crystal display panel of the present disclosure, some devices are omitted in FIG. 2. As shown in FIGS. 1-2, the tri-state liquid crystal display panel 100 includes a first substrate 10, an insulation layer 12, a second substrate 20, a liquid crystal layer 14, a first polarizer 16, a second polarizer 18, a first electrode 31, a second electrode 32, a third patterned electrode 33 and a fourth patterned electrode 34. The first substrate 10 is disposed to face the second substrate 20. The first substrate 10 and the second substrate 20 are transparent substrates. The first substrate 10 and the second substrate 20 may be hard substrates, such as glass substrates or quartz substrates, or flexible substrates, such as plastic substrates, but not limited thereto. The insulation layer 12 is disposed on the first substrate 10. The material of the insulation layer 12 may be inorganic insulation materials, such as silicon oxide, silicon nitride and silicon oxynitride, or organic insulation materials, such as acrylic and epoxy resin, but not limited thereto. The liquid crystal layer 14 is disposed between the first substrate 10 and the second substrate 20. The liquid crystal layer 14 includes the polymer network liquid crystals (PNLC). The operating voltage of the polymer network liquid crystals is lower and the polymer network liquid crystals are more energy efficient. The polymer network liquid crystal molecules are smaller and can be driven by horizontal electric fields. Relatively speaking, the operating voltage of polymer dispersed liquid crystals (PDLC) is higher (usually in a range of 20 Volts to 30 Volts); it is therefore energy consuming. Moreover, the polymer dispersed liquid crystal molecules are larger and thus hardly driven by the horizontal electric fields. The first polarizer 16 is disposed on the first substrate 10. For example, the first polarizer 16 is disposed at the outer side of the first substrate 10 relative to the second substrate 20, but not limited thereto. The second polarizer 18 is disposed on the second substrate 20. For example, the second polarizer 18 is disposed at the outer side of the second substrate 20 relative to the first substrate 10, but not limited thereto. The first polarizer 16 has a first polarization axis 16P so that the first polarizer 16 allows a specific polarized light passing therethrough, which is parallel to the first polarization axis 16P in this embodiment, and blocks lights with other polarizations. The second polarizer 18 has a second polarization axis 18P so that the second polarizer 18 allows a specific polarized light passing therethrough, which is parallel to the second polarization axis 18P in this embodiment, and blocks lights with other polarizations. The first electrode 31 is disposed between the first substrate 10 and the insulation layer 12. The first electrode 31 preferably includes a planar electrode. The second electrode 32 is disposed between the second substrate 20 and the liquid crystal layer 14. The second electrode 32 preferably includes a planar electrode. Besides, there may be an overcoat layer 22 disposed between the second electrode 32 and the liquid crystal layer 14. The third patterned electrode 33 is disposed between the insulation layer 12 and the liquid crystal layer 14. The third patterned electrode 33 includes a patterned electrode. The fourth patterned electrode 34 is disposed between the insulation layer 12 and the liquid crystal layer 14. The fourth patterned electrode 34 includes a patterned electrode. For example, the first electrode 31 and the second electrode 32 may be patterns without openings or slits. As shown in FIGS. 1 and 5, the third patterned electrode 33 and the fourth patterned electrode 34 are substantially in the same plane. The third patterned electrode 33 may be a comb-shaped electrode. The third patterned electrode 33 includes a first main electrode 33M and a plurality of first branch electrodes 33B connected to a side of the first main electrode 33M. The fourth patterned electrode 34 may be a comb-shaped electrode. The fourth patterned electrode 34 includes a second main electrode 34M and a plurality of second branch electrodes 34B connected to a side of the second main electrode 34M. The first branch electrodes 33B of the third patterned electrode 33 and the second branch electrodes 34B of the fourth patterned electrode 34 are alternately arranged. The first branch electrodes 33B of the third patterned electrode 33 and the second branch electrodes 34B of the fourth patterned electrode 34 are preferably parallel to each other. There may be a gap S between each of the first branch electrodes 33B and the adjacent second branch electrode 34B. The third patterned electrode 33 and the fourth patterned electrode 34 may not be restricted to comb-shaped electrodes and may be other kinds of electrodes with patterns to generate horizontal electric fields. The material of the first electrode 31, the second electrode 32, the third patterned electrode 33 and the fourth patterned electrode 34 may be transparent conductive materials, such as indium tin oxide (ITO), indium zinc oxide (IZO) or other conductive materials. The first electrode 31, the second electrode 32, the third patterned electrode 33 and the fourth patterned electrode 34 can be controlled independently and respectively have the first voltage, the second voltage, the third voltage and the fourth voltage—that is to say, the first electrode 31 and the second electrode 32, the third patterned electrode 33 and the fourth patterned electrode 34 are respectively electrically connected to different power sources. For example, as shown in FIG. 2, in an embodiment the first electrode 31 is electrically connected to a first active switching device 51 and driven by the first active switching device 51. The third patterned electrode 33 is electrically connected to a second active switching device 52 and driven by the second active switching device 52. The fourth patterned electrode 34 is electrically connected to a third active switching device 53 and driven by the third active switching device 53. The first active switching device 51, the second active switching device 52 and the third active switching device 53 may be connected to the same gate line GL and switched on by the gate line GL. The first active switching device 51, the second active switching device 52 and the third active switching device 53 may be respectively connected to a first data line DL1, a second data line DL2 and a third data line DL3, but not limited thereto. In addition, the second electrode 32 (not shown in FIG. 2) may be connected to another active switching device to be driven actively or a power source to be driven inactively. The tri-state liquid crystal display panel 100 of different operating voltage in the present disclosure can alternatively provide a transmission state display mode, a dark state display mode and a haze state display mode. The operating voltage of the tri-state liquid crystal display panel under different display mode in the embodiments of the present disclosure will be illustrated in the following paragraphs. The tri-state liquid crystal display panel of the present disclosure is preferably driven by alternating approaches. In other words, the current of the tri-state liquid crystal display panel reverses direction and switches from a positive half cycle to a negative half cycle. The relation of the first voltage, the second voltage, the third voltage and the fourth voltage in each embodiment in the following paragraphs is illustrated in the positive half cycle. The relation of the voltages in the negative half cycle is opposite to that in the positive half cycle.

Figure 3:
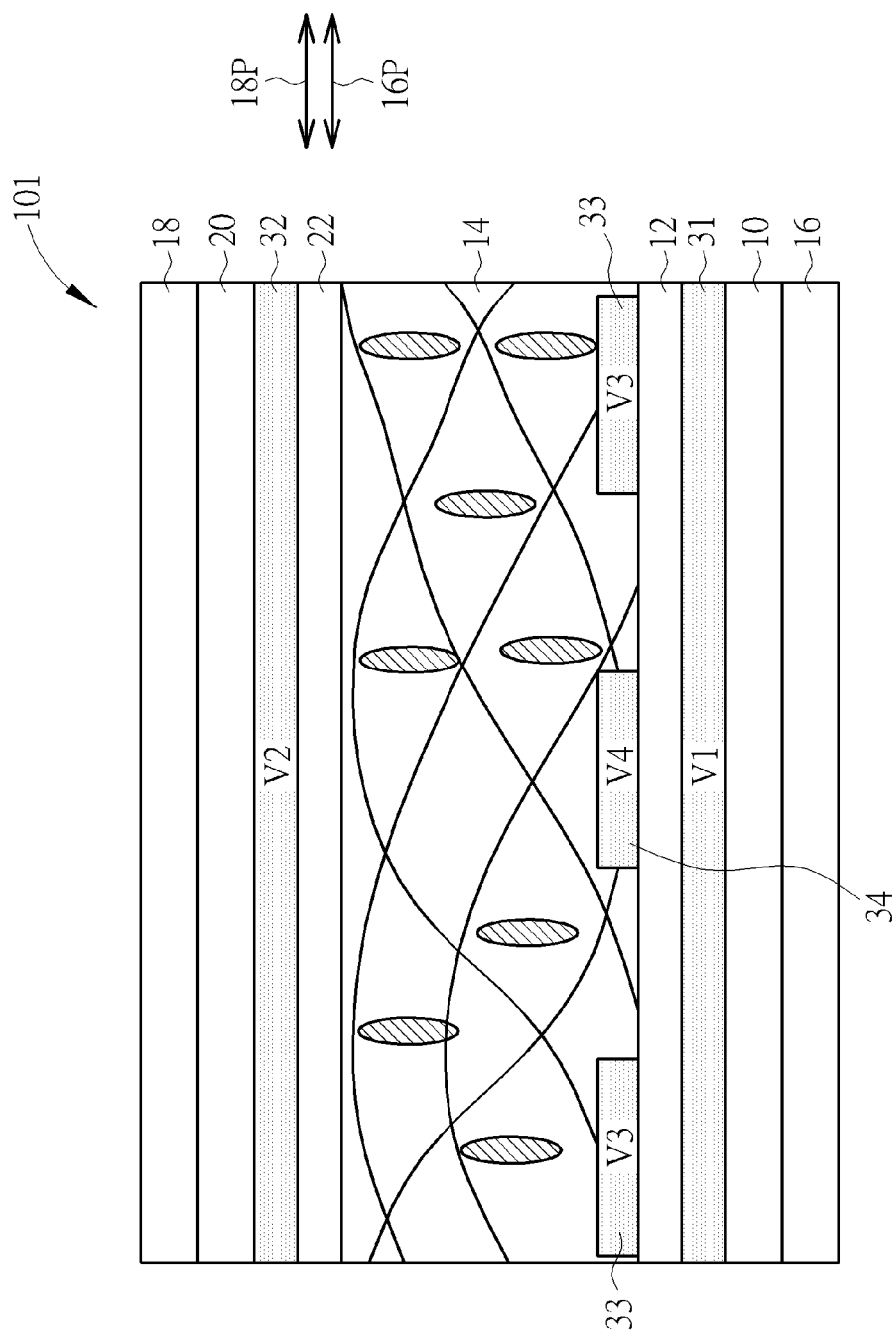
FIG. 3 is a schematic diagram illustrating a tri-state liquid crystal display panel under the transmission state display mode according to a first embodiment of the present disclosure.
Figure 4:
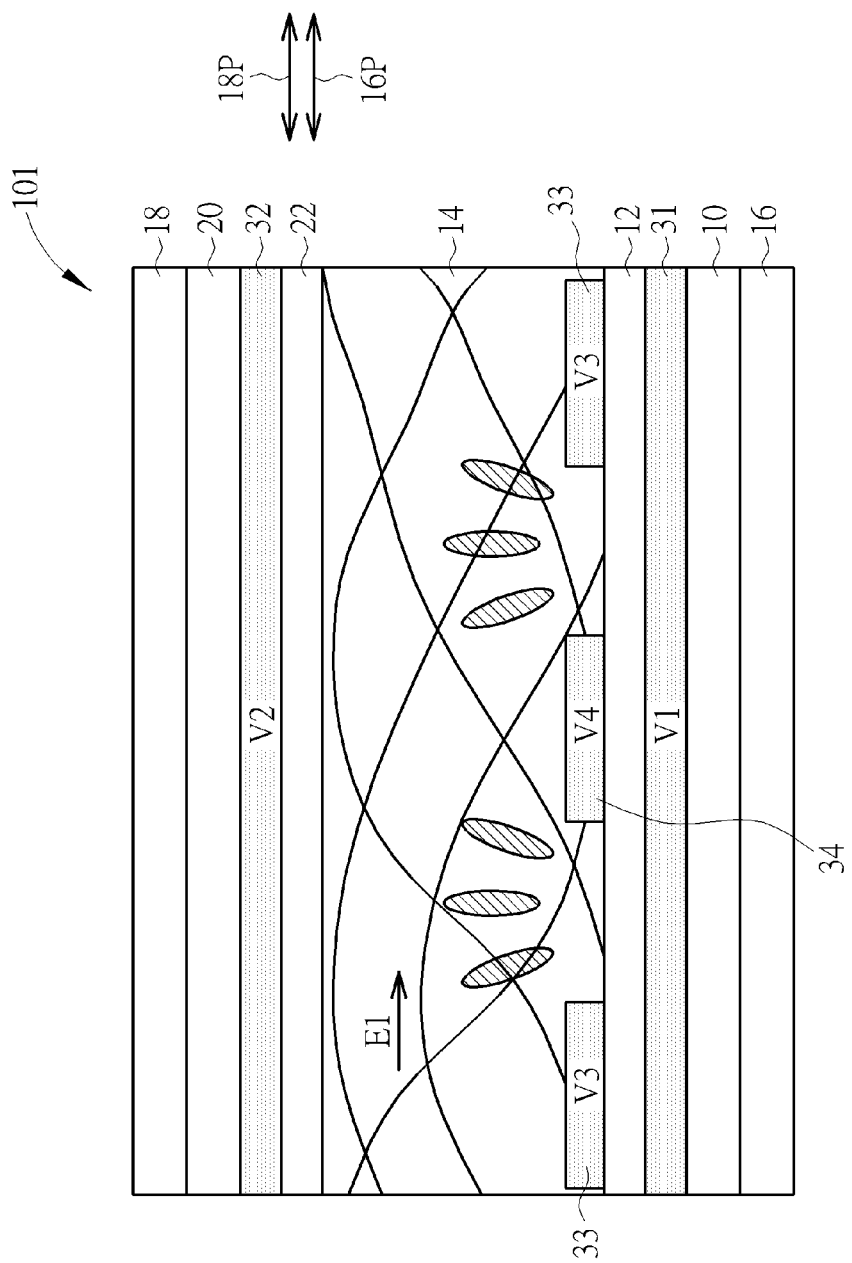
FIG. 4 is a schematic diagram illustrating the tri-state liquid crystal display panel under the dark state display mode according to the first embodiment of the present disclosure.

Please refer to FIGS. 3-5. FIG. 3 is a schematic diagram illustrating a tri-state liquid crystal display panel under the transmission state display mode according to a first embodiment of the present disclosure. FIG. 4 is a schematic diagram illustrating the tri-state liquid crystal display panel under the dark state display mode according to the first embodiment of the present disclosure. FIG. 5 is a schematic diagram illustrating the tri-state liquid crystal display panel under the haze state display mode according to the first embodiment of the present disclosure. In this embodiment, the liquid crystal layer 14 comprises a negative type liquid crystal layer having negative dielectric anisotropy (i.e., $\Delta\varepsilon<0$). The first polarization axis 16P is substantially parallel to the second polarization axis 18P. As shown in FIG. 3, under the transmission state display mode, the first voltage V1, the second voltage V2, the third voltage V3 and the fourth voltage V4 are substantially equal. For example, the first voltage V1, the second voltage V2, the third voltage V3 and the fourth voltage V4 may all be 0 Volts or all be 5 Volts, but not limited thereto. In this condition, the liquid crystal layer 14 is under a vertical aligning force and tends to align vertically without vertical electric fields and horizontal electric fields. Therefore, no phase retardation effect occurs in the liquid crystal layer 14. Because the first polarization axis 16P is substantially parallel to the second polarization axis 18P, the polarized light passing through the first polarizer 16 also passes through the second polarizer 18. As a result, under the transmission state display mode, a viewer can see the background behind the tri-state liquid crystal display panel 101.

As shown in FIG. 4, under the dark state display mode and during the positive half cycle in this embodiment, the first voltage V1 substantially equals the second voltage V2. The third voltage V3 is higher than the first voltage V1 and the second voltage V2. The fourth voltage V4 is lower than the first voltage V1 and the second voltage V2. For example, the first voltage V1 and the second voltage V2 may both be 5 Volts, the third voltage V3 may be 10 Volts and the fourth voltage V4 may be 0 Volts, but not limited thereto. The liquid crystal layer 14 is mainly driven by a horizontal electric field E1 formed from the voltage difference between the third voltage V3 and the fourth voltage V4. And because the liquid crystal layer 14 is a negative type liquid crystal layer, its alignment direction is perpendicular to the direction of the horizontal electric field E1. Moreover, the magnitude of the horizontal electric field E1 in the positions close to the third patterned electrode 33 or the fourth patterned electrode 34 is larger than the magnitude of the horizontal electric field E1 in the positions far from the third patterned electrode 33 or the fourth patterned electrode 34. Therefore, the alignment of the polymer network liquid crystals of the liquid crystal layer 14 is shown as FIG. 4 and it acts as a role of half wave plate. In this condition, the polarization vector (i.e., the polarization direction) of the polarized light passing through the first polarizer 16 is rotated by 90 degrees and thus the polarized light is blocked by the second polarizer 18. As a result, under the dark state display mode, the viewer cannot see the background behind the tri-state liquid crystal display panel 101.

As shown in FIGS. 1 and 5, under the haze state display mode and during a positive half cycle, the first voltage V1, the third voltage V3 and the fourth voltage V4 are substantially equal. The second voltage V2 is lower than the first voltage V1, the third voltage V3 and the fourth voltage V4. For example, the first voltage V1, the third voltage V3 and the fourth voltage V4 may be in a range of 10 Volts to 15 Volts and the second voltage V2 may be in a range of 5 Volts to 7.5 Volts, but not limited thereto. In other words, the liquid crystal layer 14 is mainly driven by the vertical electric field E2 formed between the second electrode 32 and the third patterned electrode 33 and between the second electrode 32 and the fourth patterned electrode 34. And because the liquid crystal layer 14 is a negative type liquid crystal layer, its alignment direction is perpendicular to the direction of the vertical electric field E2. Therefore, the alignment of the polymer network liquid crystals of the liquid crystal layer 14 is arranged randomly in the horizontals as shown in FIG. 4, and the tri-state liquid crystal display panel 101 in this embodiment presents haze state in multi-region. As a result, under the haze state display mode, the viewer cannot clearly recognize but only roughly sees the background behind the tri-state liquid crystal display panel 101. In other words, under the haze state display mode, the tri-state liquid crystal display panel 101 is under a bright state and thus ensures privacy protection.

Accordingly, the tri-state liquid crystal display panel in the present disclosure has the transmission state display mode, the dark state display mode and the haze state display mode for both display and privacy functions, which significantly expand the applications of the liquid crystal display panel. For example, the tri-state liquid crystal display panel can be applied to liquid crystal display windows, electronic curtains, and smart vending machines with liquid crystal display panels.

Tri-state liquid crystal display panels are not restricted to the preceding embodiments in the present disclosure. Other embodiments or modifications will be detailed in the following description. In order to simplify and show the differences or modifications between the following embodiments and the above-mentioned embodiment, the same numerals denote the same components in the following description, and the similar parts are not detailed redundantly.

Figure 6:
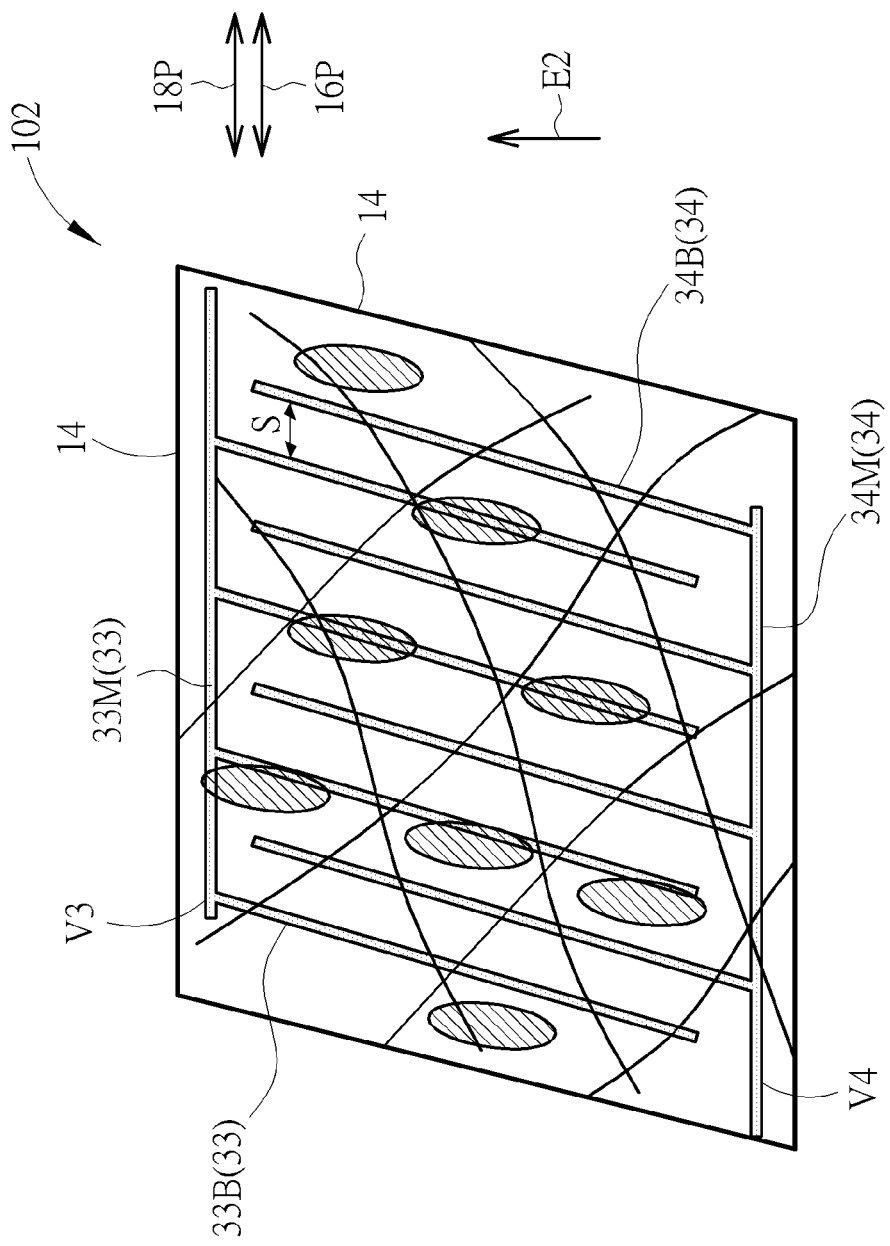
FIG. 6 is a schematic diagram illustrating a tri-state liquid crystal display panel under the transmission state display mode according to a second embodiment of the present disclosure.
Figure 7:
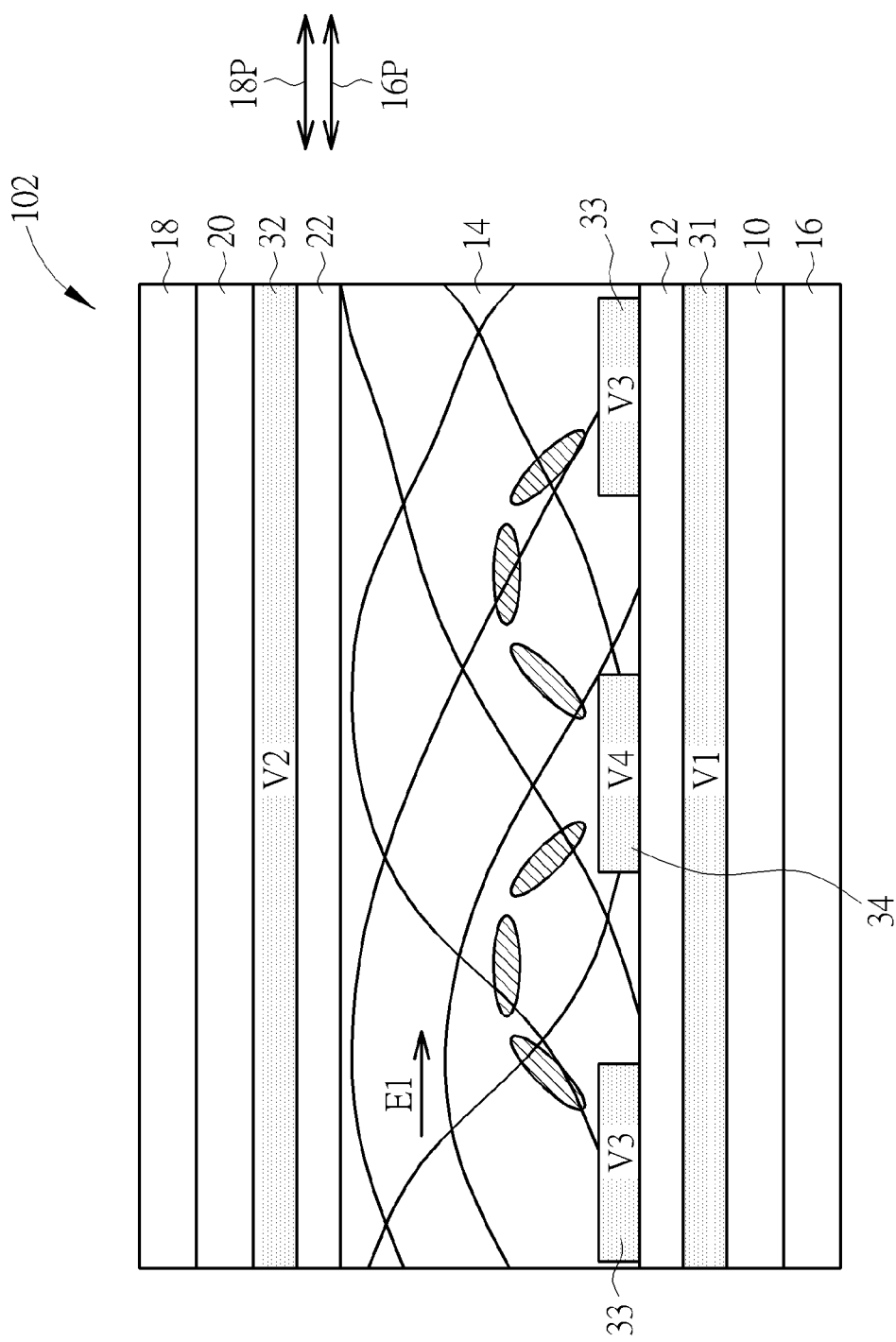
FIG. 7 is a schematic diagram illustrating the tri-state liquid crystal display panel under the dark state display mode according to the second embodiment of the present disclosure.
Figure 8:
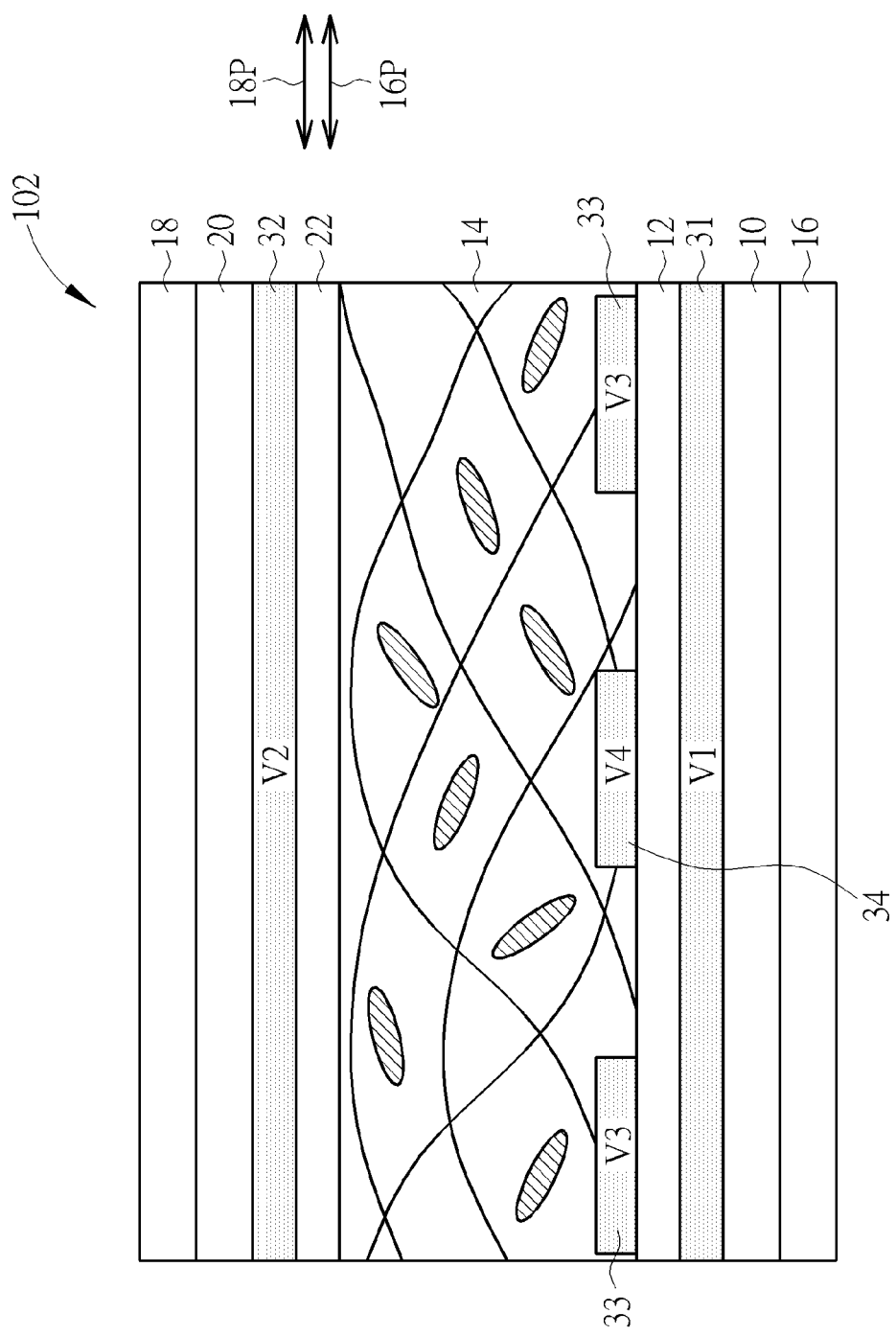
FIG. 8 is a schematic diagram illustrating the tri-state liquid crystal display panel under the haze state display mode according to the second embodiment of the present disclosure.

Please refer to FIGS. 6-8, and also refer to FIG. 1. FIG. 6 is a schematic diagram illustrating a tri-state liquid crystal display panel under the transmission state display mode according to a second embodiment of the present disclosure. FIG. 7 is a schematic diagram illustrating the tri-state liquid crystal display panel under the dark state display mode according to the second embodiment of the present disclosure. FIG. 8 is a schematic diagram illustrating the tri-state liquid crystal display panel under the haze state display mode according to the second embodiment of the present disclosure. In this embodiment, the liquid crystal layer 14 comprises a positive type liquid crystal layer having positive dielectric anisotropy (i.e., $\Delta\varepsilon>0$). The first polarization axis 16P is substantially parallel to the second polarization axis 18P. As shown in FIGS. 1 and 6, under the transmission state display mode and during a positive half cycle, the first voltage V1, the third voltage V3 and the fourth voltage V4 are substantially equal. The second voltage V2 is lower than the first voltage V1, the third voltage V3 and the fourth voltage V4. For example, the first voltage V1, the third voltage V3 and the fourth voltage V4 may be in a range of 10 Volts to 15 Volts, such as 10 Volts, and the second voltage V2 may be in a range of 5 Volts to 7.5 Volts, such as 5 Volts, but not limited thereto. The liquid crystal layer 14 is mainly driven by the vertical electric field E2 formed between the second electrode 32 and the third patterned electrode 33 and between the second electrode 32 and the fourth patterned electrode 34. And because the liquid crystal layer 14 is a positive type liquid crystal layer, its alignment direction is parallel to the direction of the vertical electric field E2 and thus the liquid crystal layer 14 is aligned vertically. Therefore, no phase retardation effect occurs in the liquid crystal layer 14. Because the first polarization axis 16P is substantially parallel to the second polarization axis 18P, the polarized light passing through the first polarizer 16 also penetrates the second polarizer 18. As a result, under the transmission state display mode, the viewer can see the background behind the tri-state liquid crystal display panel 102.

As shown in FIG. 7, under the dark state display mode and during the positive half cycle in this embodiment, the first voltage V1 substantially equals the second voltage V2. The third voltage V3 is higher than the first voltage V1 and the second voltage V2. The fourth voltage V4 is lower than the first voltage V1 and the second voltage V2. For example, the first voltage V1 and the second voltage V2 may both be 5 Volts, the third voltage V3 may be 10 Volts and the fourth voltage V4 may be 0 Volts, but not limited thereto. The liquid crystal layer 14 is mainly driven by the horizontal electric field E1 formed from the voltage difference between the third voltage V3 and the fourth voltage V4. And because the liquid crystal layer 14 is a positive type liquid crystal layer, its alignment direction is parallel to the direction of the horizontal electric field E1. Moreover, the magnitude of the horizontal electric field E1 in the positions close to the third patterned electrode 33 or the fourth patterned electrode 34 is larger than the magnitude of the horizontal electric field E1 in the positions far from the third patterned electrode 33 or the fourth patterned electrode 34. Therefore, the alignment of the polymer network liquid crystals of the liquid crystal layer 14 is shown as FIG. 7 and it acts as a role of half wave plate. In this condition, the polarization vector of the polarized light passing through the first polarizer 16 is rotated by 90 degrees and thus the polarized light is blocked by the second polarizer 18. As a result, under the dark state display mode, the viewer cannot see the background behind the tri-state liquid crystal display panel 102.

As shown in FIG. 8, under the haze state display mode and during the positive half cycle in this embodiment, the first voltage V1, the second voltage V2, the third voltage V3 and the fourth voltage V4 are substantially equal. For example, the first voltage V1, the second voltage V2, the third voltage V3 and the fourth voltage V4 may all be 0 Volts or all be 5 Volts, but not limited thereto. In this situation, because the liquid crystal layer 14 is restricted by the polymer network structure, the alignment of the polymer network liquid crystals of the liquid crystal layer 14 is arranged randomly in the horizontals as shown in FIG. 8 when there is no vertical electric field and horizontal electric field, and the tri-state liquid crystal display panel 102 in this embodiment presents haze state in multiple-region. As a result, under the haze state display mode, the viewer cannot clearly recognize but only roughly sees the background behind the tri-state liquid crystal display panel 102.

Figure 9:
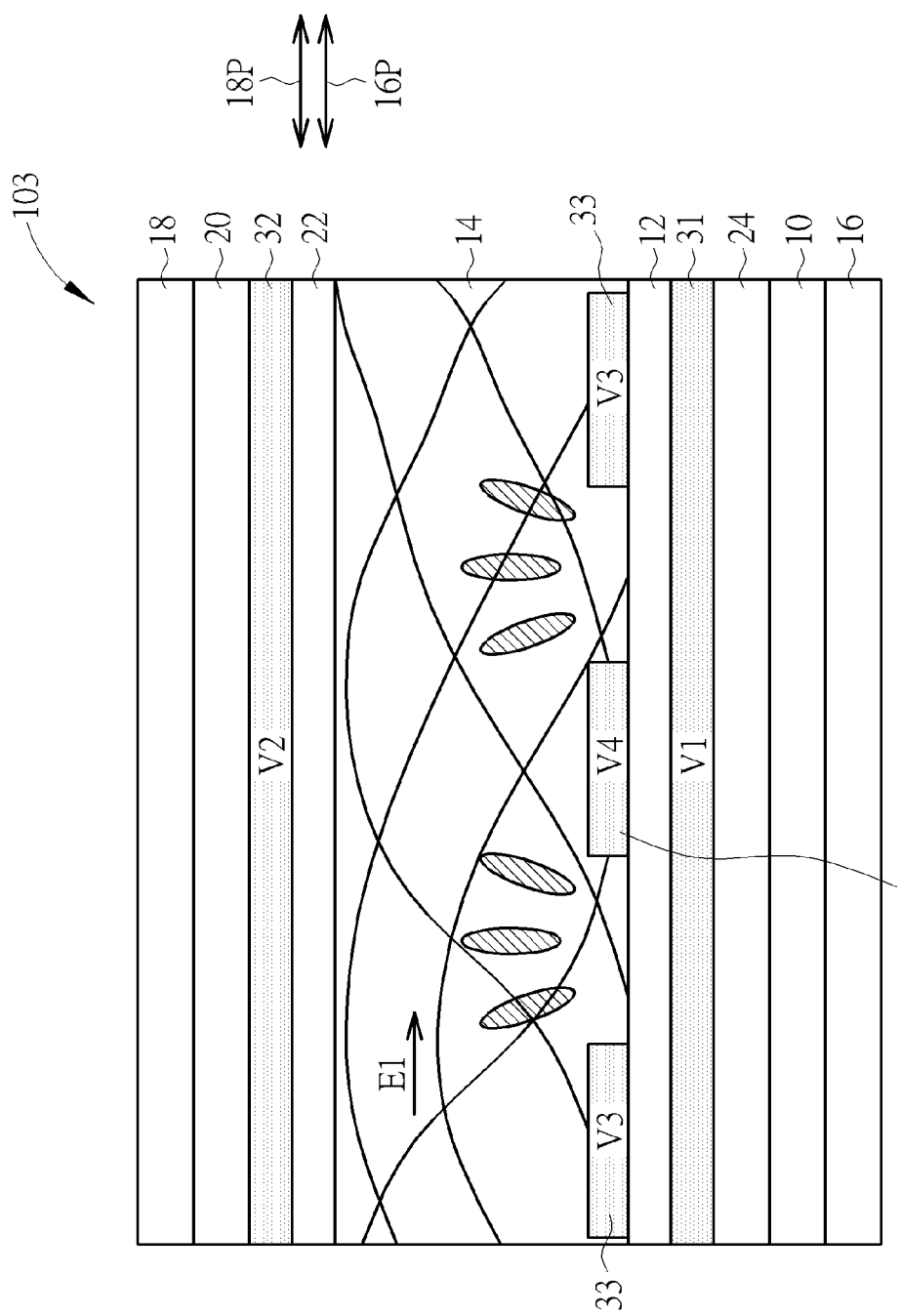
FIG. 9 is a schematic diagram illustrating a tri-state liquid crystal display panel under the transmission state display mode according to a third embodiment of the present disclosure.
Figure 10:
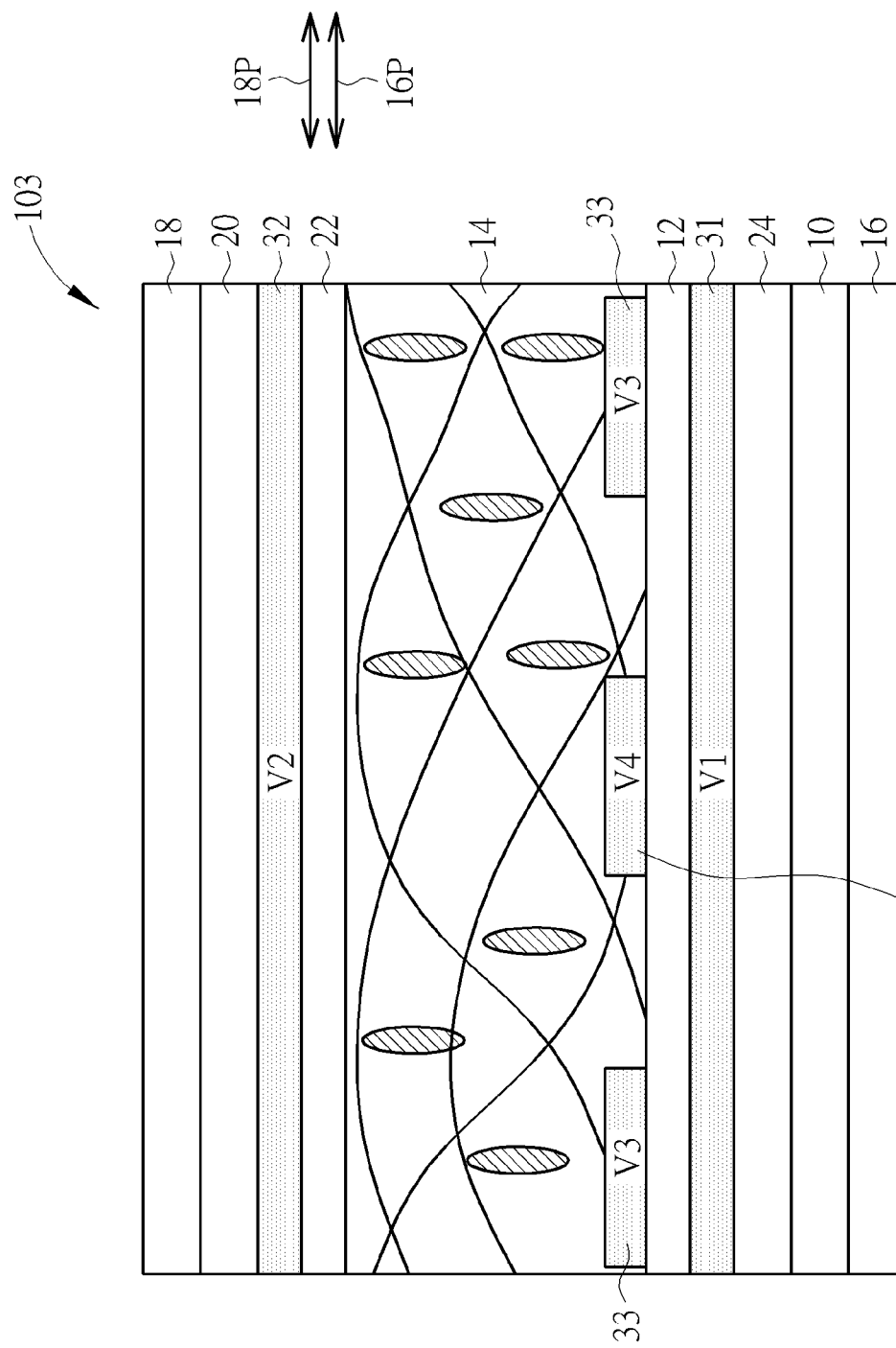
FIG. 10 is a schematic diagram illustrating the tri-state liquid crystal display panel under the dark state display mode according to the third embodiment of the present disclosure.
Figure 11:
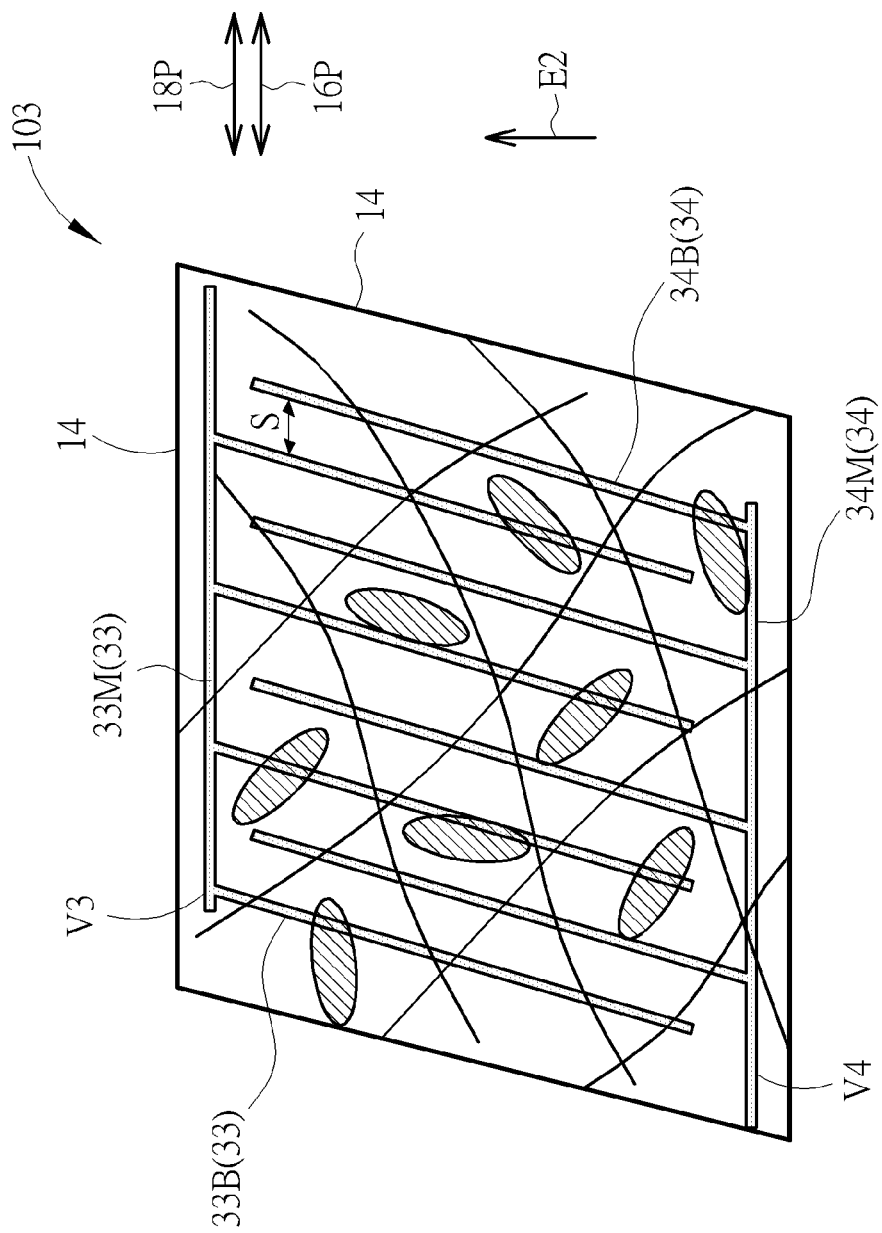
FIG. 11 is a schematic diagram illustrating the tri-state liquid crystal display panel under the haze state display mode according to the third embodiment of the present disclosure.

Please refer to FIGS. 9-11, and also refer to FIG. 1. FIG. 9 is a schematic diagram illustrating a tri-state liquid crystal display panel under the transmission state display mode according to a third embodiment of the present disclosure. FIG. 10 is a schematic diagram illustrating the tri-state liquid crystal display panel under the dark state display mode according to the third embodiment of the present disclosure. FIG. 11 is a schematic diagram illustrating the tri-state liquid crystal display panel under the haze state display mode according to the third embodiment of the present disclosure. In this embodiment, the liquid crystal layer 14 comprises a negative type liquid crystal layer. The first polarization axis 16P is substantially parallel to the second polarization axis 18P. The tri-state liquid crystal display panel 103 further comprises a half-wave plate 24 (sometimes also refer to as a half-wave plate, a half-wave phase retardation plate, a half wave retardation plate or a ½ wave plate) disposed between the first polarizer 16 and the first electrode 31. For example, the half-wave plate 24 may be disposed between the first substrate 10 and the first electrode 31 or between the first polarizer 16 and the first substrate 10. As shown in FIG. 9, under the transmission state display mode and during the positive half cycle in this embodiment, the first voltage V1 substantially equals the second voltage V2. The third voltage V3 is higher than the first voltage V1 and the second voltage V2. The fourth voltage V4 is lower than the first voltage V1 and the second voltage V2. For example, the first voltage V1 and the second voltage V2 may both be 5 Volts, the third voltage V3 may be 10 Volts and the fourth voltage V4 may be 0 Volts, but not limited thereto. The liquid crystal layer 14 is mainly driven by the horizontal electric field E1 formed from the voltage difference between the third voltage V3 and the fourth voltage V4. And because the liquid crystal layer 14 is a negative type liquid crystal layer, its alignment direction is perpendicular to the direction of the horizontal electric field E1. Moreover, the magnitude of the horizontal electric field E1 in the positions close to the third patterned electrode 33 or the fourth patterned electrode 34 is larger than the magnitude of the horizontal electric field E1 in the positions far from the third patterned electrode 33 or the fourth patterned electrode 34. Therefore, the alignment of the polymer network liquid crystals of the liquid crystal layer 14 is shown as FIG. 9 and it acts as a role of half wave plate. In this condition, after penetrating the half-wave plate 24, the polarization vector of polarized light passing through the first polarizer 16 is rotated by 90 degrees. After penetrating the liquid crystal layer 14, the polarization vector of the polarized light passing through the half-wave plate 24 is further rotated by 90 degrees. Accordingly, the polarized light can pass through the second polarizer 18. As a result, under the transmission state display mode, the viewer can see the background behind the tri-state liquid crystal display panel 103.

As shown in FIG. 10, under the dark state display mode, the first voltage V1, the second voltage V2, the third voltage V3 and the fourth voltage V4 are substantially equal. For example, the first voltage V1, the second voltage V2, the third voltage V3 and the fourth voltage V4 may all be 0 Volts or all be 5 Volts, but not limited thereto. In this situation, the liquid crystal layer 14 tends to align vertically without vertical electric fields and horizontal electric fields. Therefore, no phase retardation effect occurs in the liquid crystal layer 14. In this condition, after penetrating the half-wave plate 24, the polarization vector of polarized light passing through the first polarizer 16 is rotated by 90 degrees and thus the polarized light is blocked by the second polarizer 18. As a result, under the dark state display mode, the viewer cannot see the background behind the tri-state liquid crystal display panel 103.

As shown in FIGS. 1 and 11, under the haze state display mode and during a positive half cycle, the first voltage V1, the third voltage V3 and the fourth voltage V4 are substantially equal. The second voltage V2 is lower than the first voltage V1, the third voltage V3 and the fourth voltage V4. For example, the first voltage V1, the third voltage V3 and the fourth voltage V4 may be in a range of 10 Volts to 15 Volts and the second voltage V2 may be in a range of 5 Volts to 7.5 Volts, but not limited thereto. The liquid crystal layer 14 is mainly driven by the vertical electric field E2 formed between the second electrode 32 and the third patterned electrode 33 and between the second electrode 32 and the fourth patterned electrode 34. And because the liquid crystal layer 14 is a negative type liquid crystal layer, its alignment direction is perpendicular to the direction of the vertical electric field E2. Therefore, the alignment of the polymer network liquid crystals of the liquid crystal layer 14 is arranged randomly in the horizontals as shown in FIG. 11, and the tri-state liquid crystal display panel 103 in this embodiment presents multiple-region haze visual effects. As a result, under the haze state display mode, the viewer cannot clearly recognize but only roughly sees the background behind the tri-state liquid crystal display panel 103.

Figure 12:
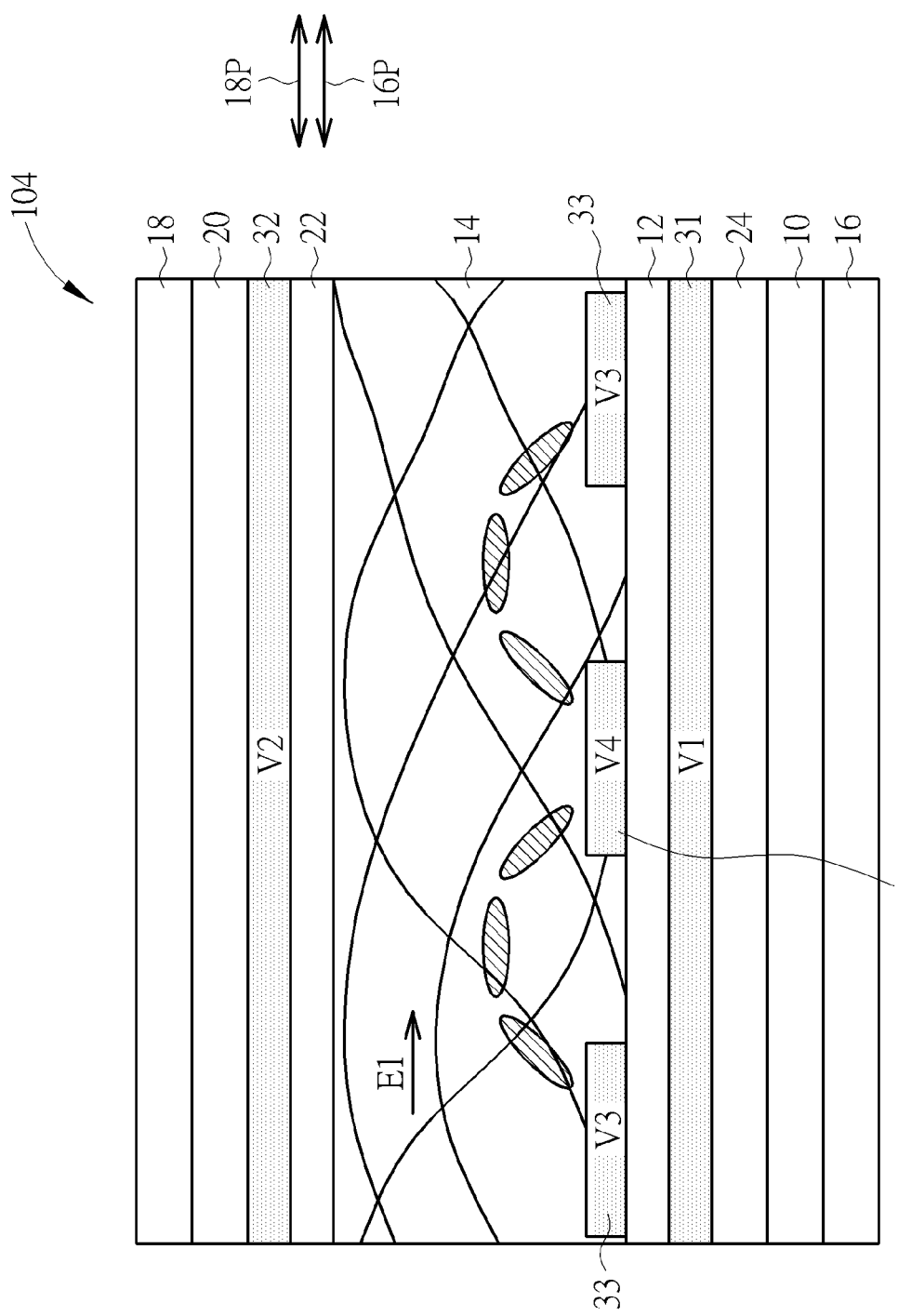
FIG. 12 is a schematic diagram illustrating a tri-state liquid crystal display panel under the transmission state display mode according to a fourth embodiment of the present disclosure.
Figure 13:
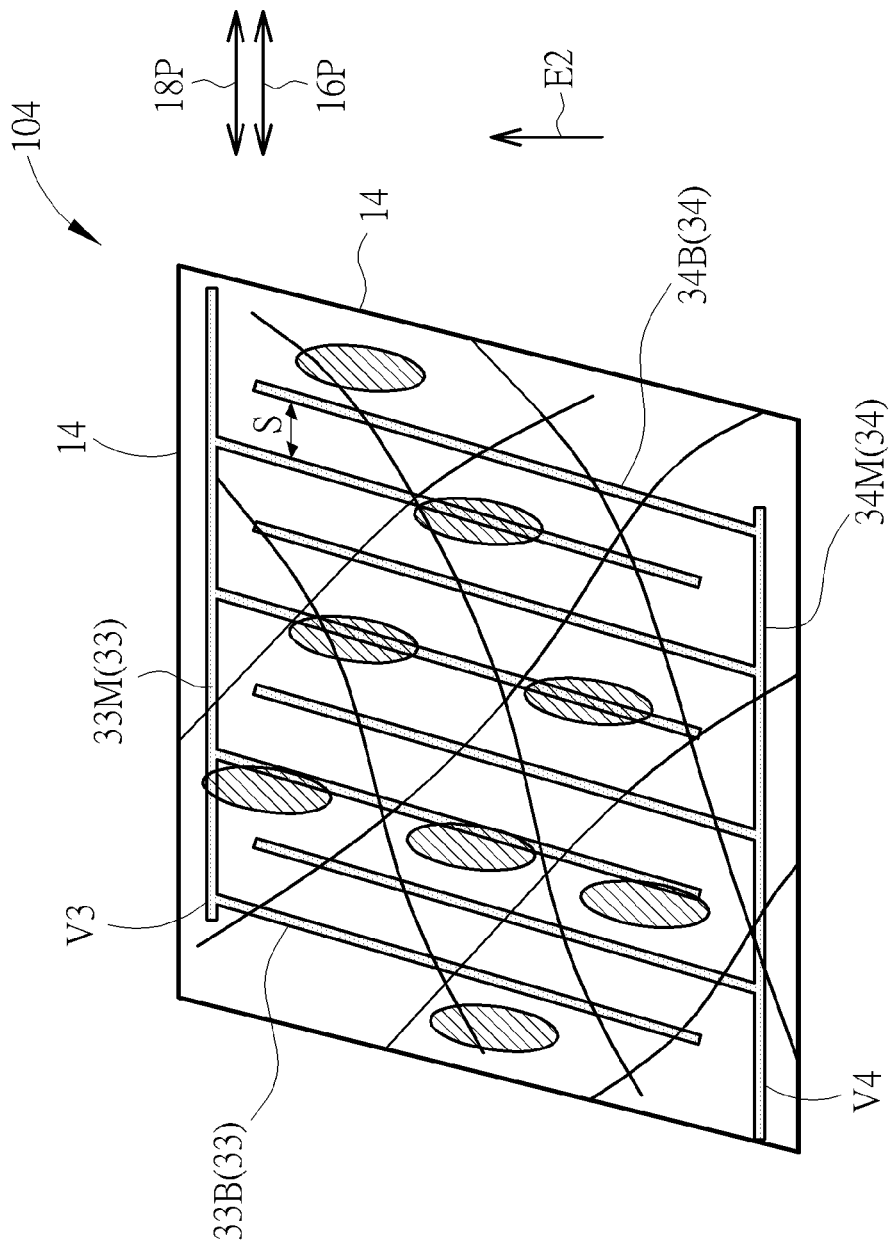
FIG. 13 is a schematic diagram illustrating the tri-state liquid crystal display panel under the dark state display mode according to the fourth embodiment of the present disclosure.
Figure 14:
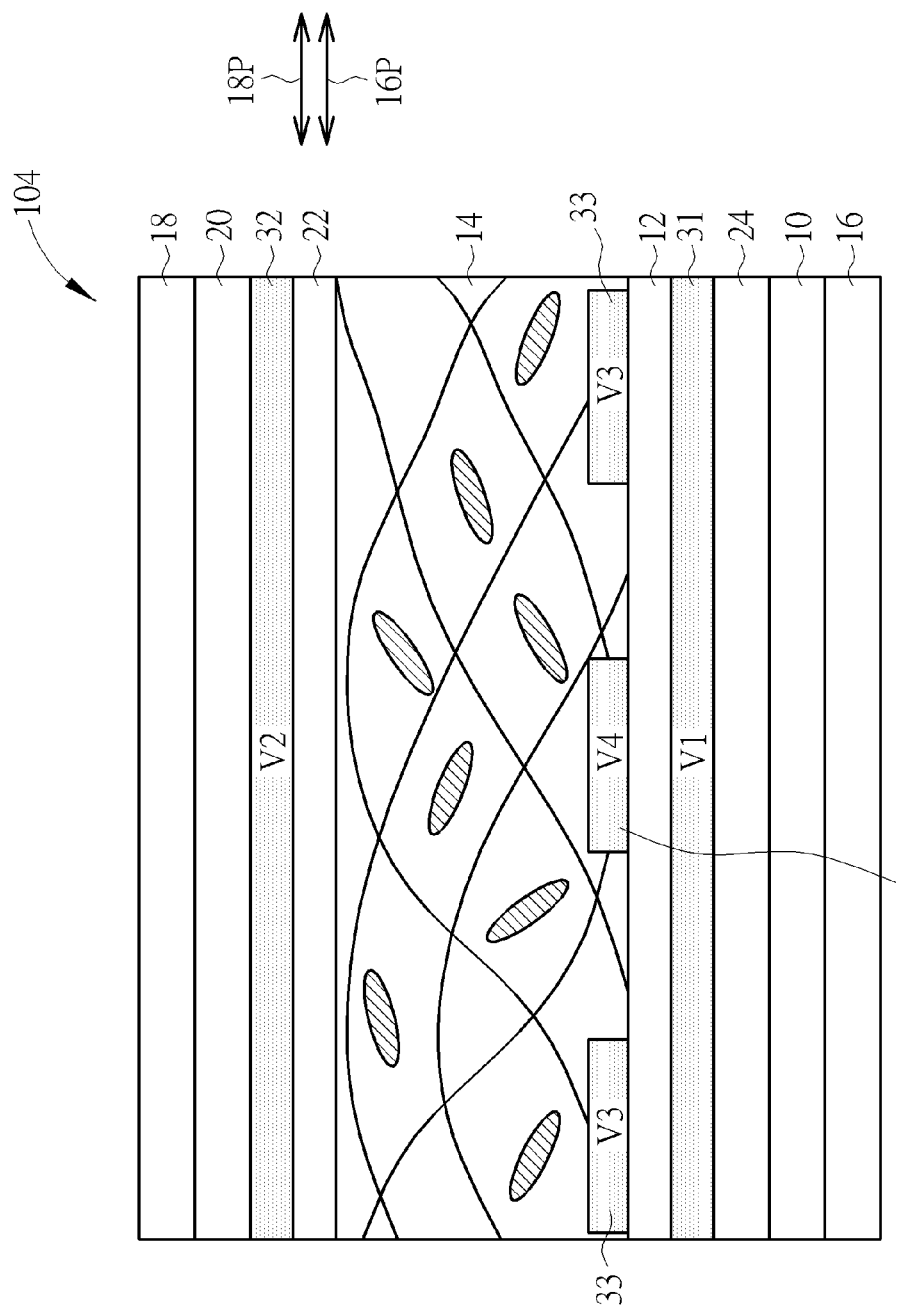
FIG. 14 is a schematic diagram illustrating the tri-state liquid crystal display panel under the haze state display mode according to the fourth embodiment of the present disclosure.

Please refer to FIGS. 12-14, and also refer to FIG. 1. FIG. 12 is a schematic diagram illustrating a tri-state liquid crystal display panel under the transmission state display mode according to a fourth embodiment of the present disclosure. FIG. 13 is a schematic diagram illustrating the tri-state liquid crystal display panel under the dark state display mode according to the fourth embodiment of the present disclosure. FIG. 14 is a schematic diagram illustrating the tri-state liquid crystal display panel under the haze state display mode according to the fourth embodiment of the present disclosure. In this embodiment, the liquid crystal layer 14 comprises a positive type liquid crystal layer. The first polarization axis 16P is substantially parallel to the second polarization axis 18P. The tri-state liquid crystal display panel 104 further comprises a half-wave plate 24 disposed between the first polarizer 16 and the first electrode 31. As shown in FIG. 12, under the transmission state display mode and during a positive half cycle, the first voltage V1 substantially equals the second voltage V2. The third voltage V3 is higher than the first voltage V1 and the second voltage V2. The fourth voltage V4 is lower than the first voltage V1 and the second voltage V2. For example, the first voltage V1 and the second voltage V2 may both be 5 Volts, the third voltage V3 may be 10 Volts and the fourth voltage V4 may be 0 Volts, but not limited thereto. The liquid crystal layer 14 is mainly driven by the horizontal electric field E1 formed from the voltage difference between the third voltage V3 and the fourth voltage V4. And because the liquid crystal layer 14 is a positive type liquid crystal layer, its alignment direction is parallel to the direction of the horizontal electric field E1. Moreover, the magnitude of the horizontal electric field E1 in the positions close to the third patterned electrode 33 or the fourth patterned electrode 34 is larger than the magnitude of the horizontal electric field E1 in the positions far from the third patterned electrode 33 or the fourth patterned electrode 34. Therefore, the alignment of the polymer network liquid crystals of the liquid crystal layer 14 is shown as FIG. 12 and it acts as a role of half wave plate. In this condition, after penetrating the half-wave plate 24, the polarization vector of polarized light passing through the first polarizer 16 is rotated by 90 degrees. After penetrating the liquid crystal layer 14, the polarization vector of the polarized light passing through the half-wave plate 24 is further rotated by 90 degrees. Accordingly, the polarized light can pass through the second polarizer 18. As a result, under the transmission state display mode, the viewer can see the background behind the tri-state liquid crystal display panel 104.

As shown in FIGS. 1 and 13, under the dark state display mode and during the positive half cycle in this embodiment, the first voltage V1, the third voltage V3 and the fourth voltage V4 are substantially equal. The second voltage V2 is lower than the first voltage V1, the third voltage V3 and the fourth voltage V4. For example, the first voltage V1, the third voltage V3 and the fourth voltage V4 may be in a range of 10 Volts to 15 Volts, such as 10 Volts, and the second voltage V2 may be in a range of 5 Volts to 7.5 Volts, such as 5 Volts, but not limited thereto. In other words, the liquid crystal layer 14 is mainly driven by the vertical electric field E2 formed between the second electrode 32 and the third patterned electrode 33 and between the second electrode 32 and the fourth patterned electrode 34. And because the liquid crystal layer 14 is a positive type liquid crystal layer, its alignment direction is parallel to the direction of the vertical electric field E2 and thus the liquid crystal layer 14 is aligned vertically. Therefore, no phase retardation effect occurs in the liquid crystal layer 14. In this condition, after penetrating the half-wave plate 24, the polarization vector of the polarized light passing through the first polarizer 16 is rotated by 90 degrees and thus the polarized light is blocked by the second polarizer 18. As a result, under the dark state display mode, the viewer cannot see the background behind the tri-state liquid crystal display panel 104.

As shown in FIG. 14, under the haze state display mode, the first voltage V1, the second voltage V2, the third voltage V3 and the fourth voltage V4 are substantially equal. For example, the first voltage V1, the second voltage V2, the third voltage V3 and the fourth voltage V4 may all be 0 Volts or all be 5 Volts, but not limited thereto. In this situation, because the liquid crystal layer 14 is restricted by the polymer network structure, the alignment of the polymer network liquid crystals of the liquid crystal layer 14 is arranged randomly in the horizontals as shown in FIG. 14 without vertical electric fields and horizontal electric fields, and the tri-state liquid crystal display panel 104 in this embodiment presents multiple-region haze visual effects. As a result, under the haze state display mode, the viewer cannot clearly recognize but only roughly sees the background behind the tri-state liquid crystal display panel 104.

Figure 15:
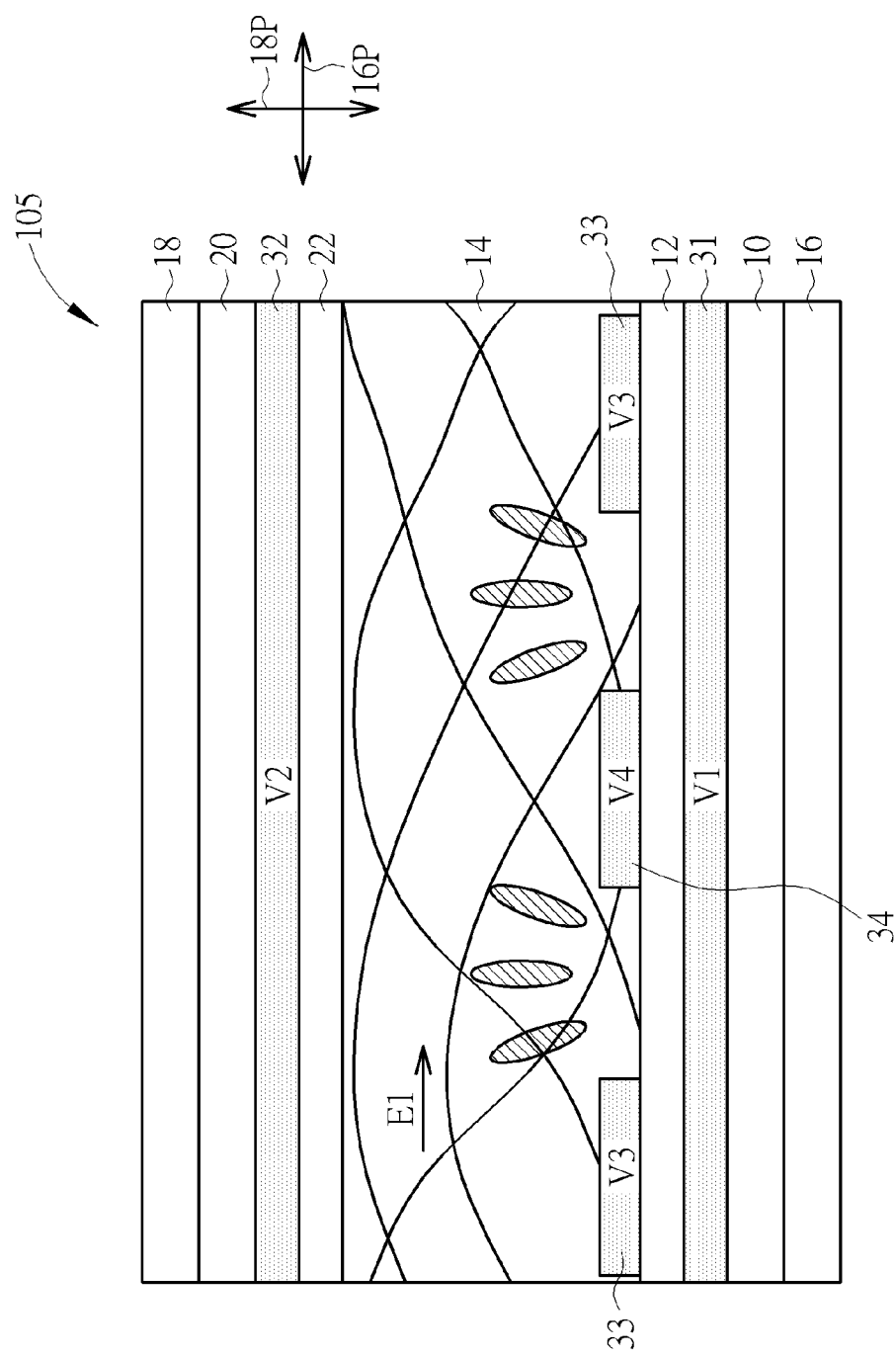
FIG. 15 is a schematic diagram illustrating a tri-state liquid crystal display panel under the transmission state display mode according to a fifth embodiment of the present disclosure.
Figure 16:
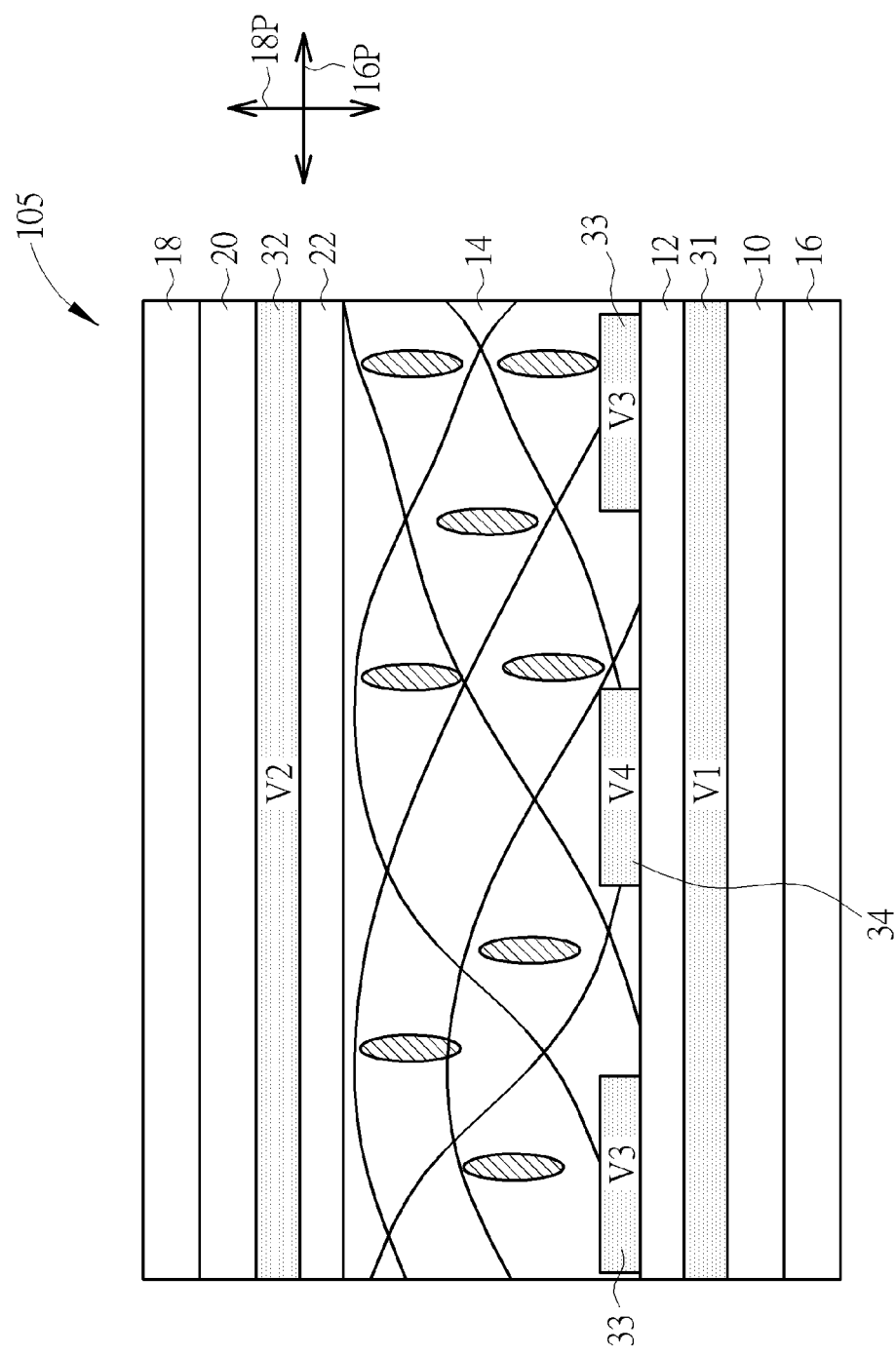
FIG. 16 is a schematic diagram illustrating the tri-state liquid crystal display panel under the dark state display mode according to the fifth embodiment of the present disclosure.
Figure 17:
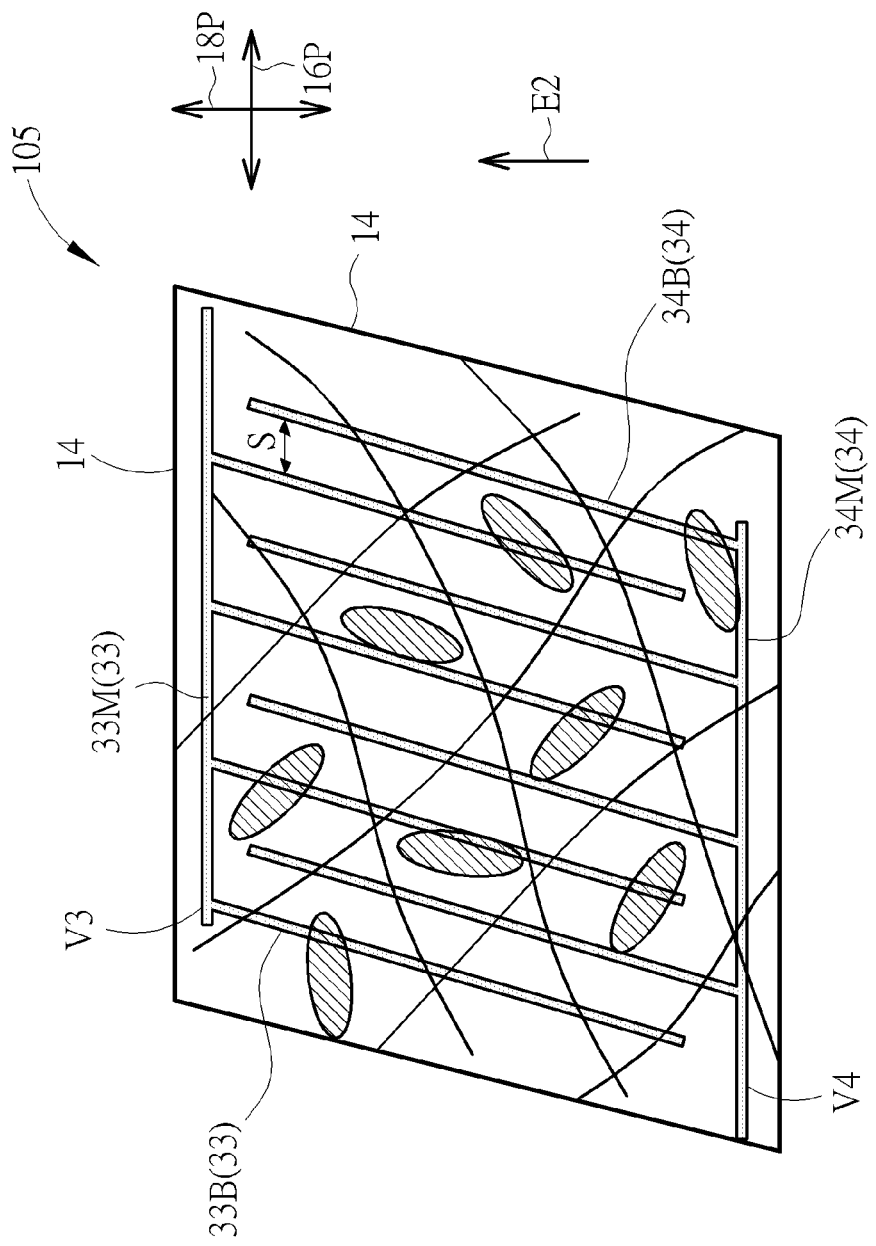
FIG. 17 is a schematic diagram illustrating the tri-state liquid crystal display panel under the haze state display mode according to the fifth embodiment of the present disclosure.

Please refer to FIGS. 15-17, and also refer to FIG. 1. FIG. 15 is a schematic diagram illustrating a tri-state liquid crystal display panel under the transmission state display mode according to a fifth embodiment of the present disclosure. FIG. 16 is a schematic diagram illustrating the tri-state liquid crystal display panel under the dark state display mode according to the fifth embodiment of the present disclosure. FIG. 17 is a schematic diagram illustrating the tri-state liquid crystal display panel under the haze state display mode according to the fifth embodiment of the present disclosure. In this embodiment, the liquid crystal layer 14 comprises a negative type liquid crystal layer. The first polarization axis 16P is substantially perpendicular to the second polarization axis 18P. As shown in FIG. 15, under the transmission state display mode and during the positive half cycle in this embodiment, the first voltage V1 substantially equals the second voltage V2. The third voltage V3 is higher than the first voltage V1 and the second voltage V2. The fourth voltage V4 is lower than the first voltage V1 and the second voltage V2. For example, the first voltage V1 and the second voltage V2 may both be 5 Volts, the third voltage V3 may be 10 Volts and the fourth voltage V4 may be 0 Volts, but not limited thereto. The liquid crystal layer 14 is mainly driven by the horizontal electric field E1 formed from the voltage difference between the third voltage V3 and the fourth voltage V4. And because the liquid crystal layer 14 is a negative type liquid crystal layer, its alignment direction is perpendicular to the direction of the horizontal electric field E1. Moreover, the magnitude of the horizontal electric field E1 in the positions close to the third patterned electrode 33 or the fourth patterned electrode 34 is larger than the magnitude of the horizontal electric field E1 in the positions far from the third patterned electrode 33 or the fourth patterned electrode 34. Therefore, the alignment of the polymer network liquid crystals of the liquid crystal layer 14 is shown as FIG. 15 and it acts as a role of half wave plate. Because the first polarization axis 16P is substantially perpendicular to the second polarization axis 18P, and because the polarization vector of the polarized light passing through the first polarizer 16 is rotated by 90 degrees after penetrating the liquid crystal layer 14, the polarized light can pass through the second polarizer 18. As a result, under the transmission state display mode, the viewer can see the background behind the tri-state liquid crystal display panel 105.

As shown in FIG. 16, under the dark state display mode, the first voltage V1, the second voltage V2, the third voltage V3 and the fourth voltage V4 are substantially equal. For example, the first voltage V1, the second voltage V2, the third voltage V3 and the fourth voltage V4 may all be 0 Volts or all be 5 Volts, but not limited thereto. In this situation, the liquid crystal layer 14 is under a vertical aligning force and tends to align vertically without vertical electric fields and horizontal electric fields. Therefore, no phase retardation effect occurs in the liquid crystal layer 14. Because the first polarization axis 16P is substantially perpendicular to the second polarization axis 18P, the polarized light passing through the first polarizer 16 is blocked by the second polarizer 18. As a result, under the dark state display mode, the viewer cannot see the background behind the tri-state liquid crystal display panel 105.

As shown in FIGS. 1 and 17, under the haze state display mode and during a positive half cycle, the first voltage V1, the third voltage V3 and the fourth voltage V4 are substantially equal. The second voltage V2 is lower than the first voltage V1, the third voltage V3 and the fourth voltage V4. For example, the first voltage V1, the third voltage V3 and the fourth voltage V4 may be in a range of 10 Volts to 15 Volts and the second voltage V2 may be in a range of 5 Volts to 7.5 Volts, but not limited thereto. In other words, the liquid crystal layer 14 is mainly driven by the vertical electric field E2 formed between the second electrode 32 and the third patterned electrode 33 and between the second electrode 32 and the fourth patterned electrode 34. And because the liquid crystal layer 14 is a negative type liquid crystal layer, its alignment direction is perpendicular to the direction of the vertical electric field E2. Therefore, the alignment of the polymer network liquid crystals of the liquid crystal layer 14 is arranged randomly in the horizontals as shown in FIG. 17, and the tri-state liquid crystal display panel 105 in this embodiment presents haze state in multi-region. As a result, under the haze state display mode, the viewer cannot clearly recognize but only roughly sees the background behind the tri-state liquid crystal display panel 105.

Figure 18:
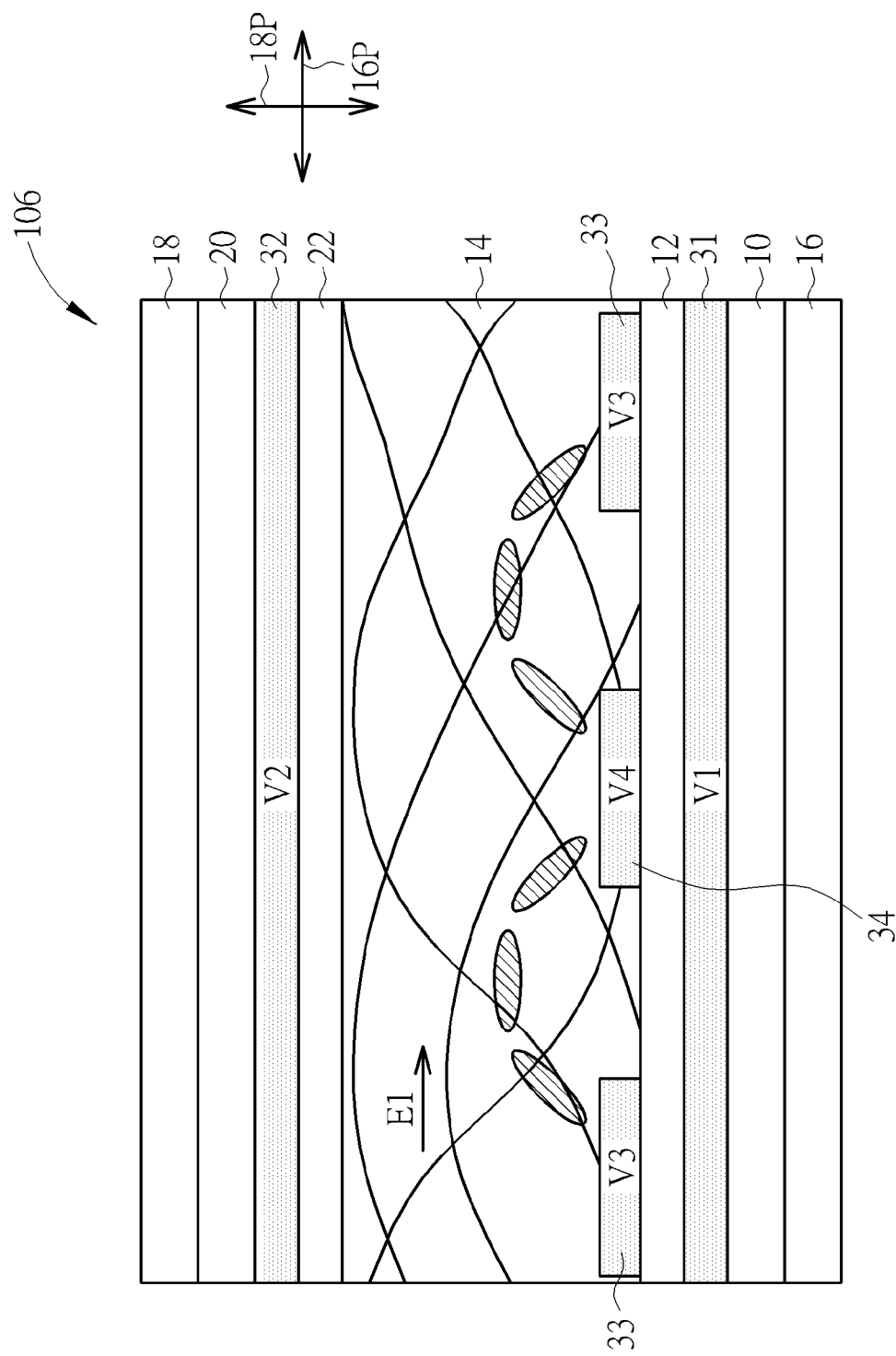
FIG. 18 is a schematic diagram illustrating a tri-state liquid crystal display panel under the transmission state display mode according to a sixth embodiment of the present disclosure.
Figure 19:
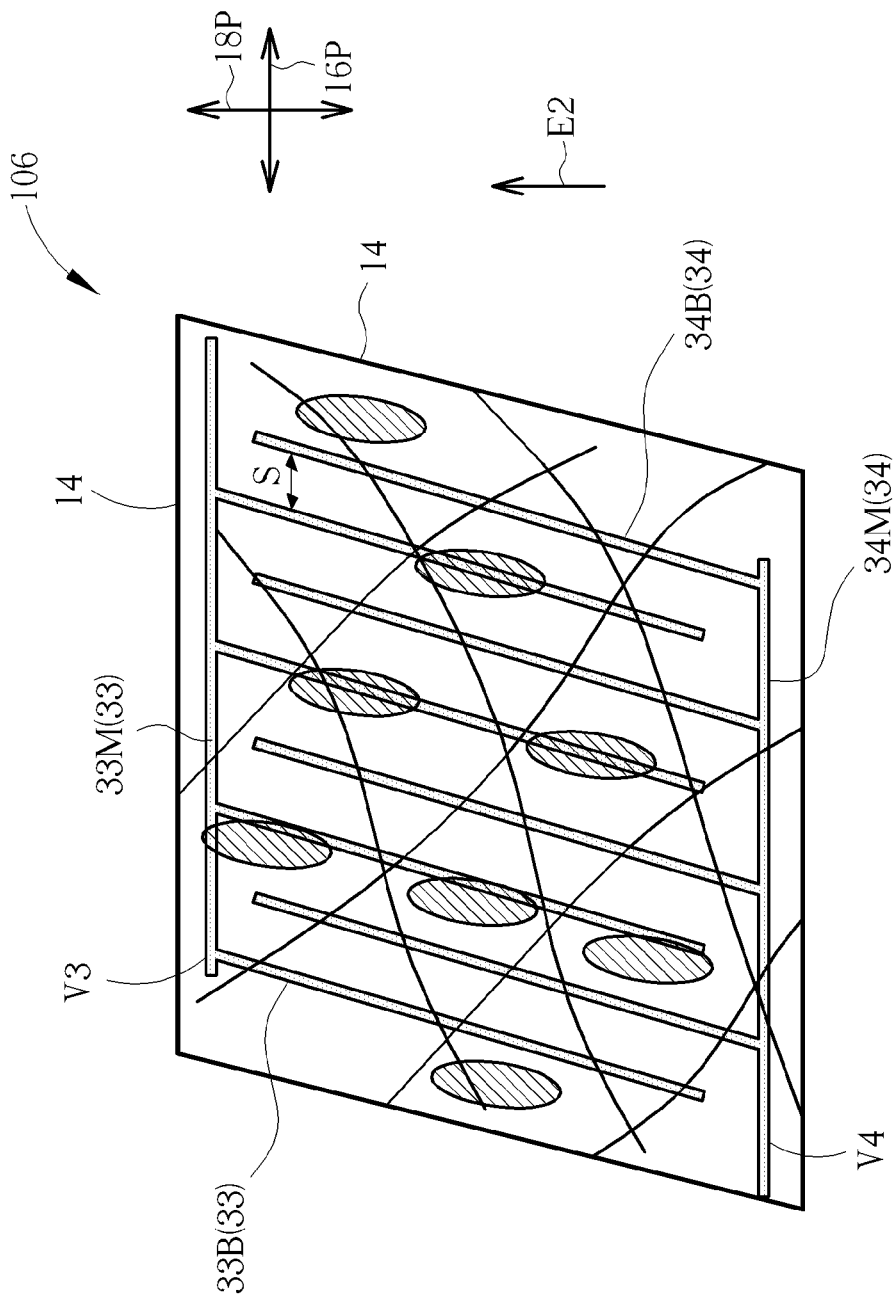
FIG. 19 is a schematic diagram illustrating the tri-state liquid crystal display panel under the dark state display mode according to the sixth embodiment of the present disclosure.
Figure 20:
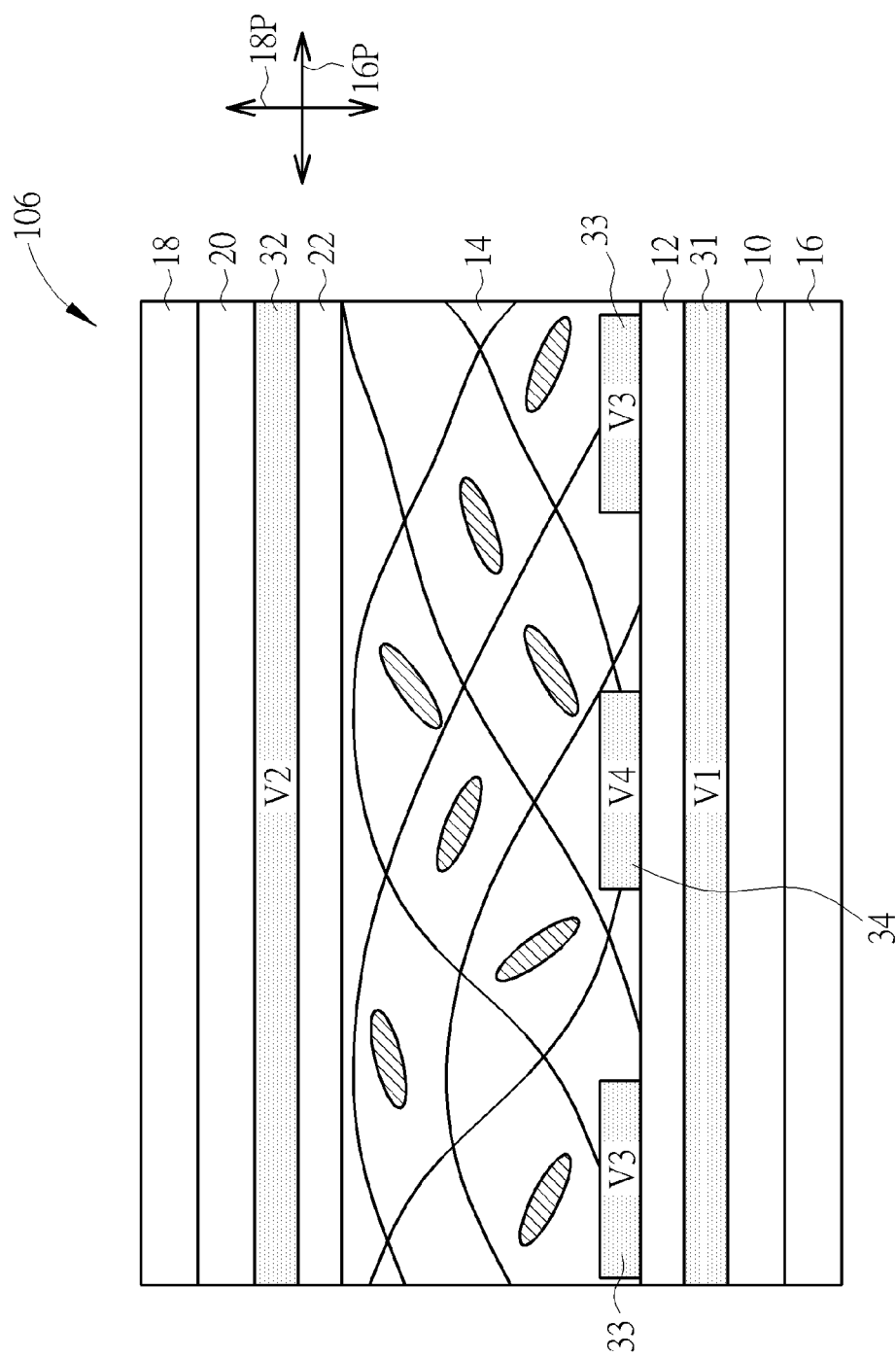
FIG. 20 is a schematic diagram illustrating the tri-state liquid crystal display panel under the haze state display mode according to the sixth embodiment of the present disclosure.

Please refer to FIGS. 18-20, and also refer to FIG. 1. FIG. 18 is a schematic diagram illustrating a tri-state liquid crystal display panel under the transmission state display mode according to a sixth embodiment of the present disclosure. FIG. 19 is a schematic diagram illustrating the tri-state liquid crystal display panel under the dark state display mode according to the sixth embodiment of the present disclosure. FIG. 20 is a schematic diagram illustrating the tri-state liquid crystal display panel under the haze state display mode according to the sixth embodiment of the present disclosure. In this embodiment, the liquid crystal layer 14 comprises a positive type liquid crystal layer. The first polarization axis 16P is substantially perpendicular to the second polarization axis 18P. As shown in FIG. 18, under the transmission state display mode and during a positive half cycle, the first voltage V1 substantially equals the second voltage V2. The third voltage V3 is higher than the first voltage V1 and the second voltage V2. The fourth voltage V4 is lower than the first voltage V1 and the second voltage V2. For example, the first voltage V1 and the second voltage V2 may both be 5 Volts, the third voltage V3 may be 10 Volts and the fourth voltage V4 may be 0 Volts, but not limited thereto. The liquid crystal layer 14 is mainly driven by the horizontal electric field E1 formed from the voltage difference between the third voltage V3 and the fourth voltage V4. And because the liquid crystal layer 14 is a positive type liquid crystal layer, its alignment direction is parallel to the direction of the horizontal electric field E1. Moreover, the magnitude of the horizontal electric field E1 in the positions close to the third electrode 33 or the fourth patterned electrode 34 is larger than the magnitude of the horizontal electric field E1 in the positions far from the third patterned electrode 33 or the fourth patterned electrode 34. Therefore, the alignment of the polymer network liquid crystals of the liquid crystal layer 14 is shown as FIG. 18 and it acts as a role of half wave plate. Because the first polarization axis 16P is substantially perpendicular to the second polarization axis 18P, and because the polarization vector of the polarized light passing through the first polarizer 16 is rotated by 90 degrees after penetrating the liquid crystal layer 14, the polarized light can pass through the second polarizer 18. As a result, under the transmission state display mode, the viewer can see the background behind the tri-state liquid crystal display panel 106.

As shown in FIGS. 1 and 19, under the dark state display mode and during the positive half cycle in this embodiment, the first voltage V1, the third voltage V3 and the fourth voltage V4 are substantially equal. The second voltage V2 is lower than the first voltage V1, the third voltage V3 and the fourth voltage V4. For example, the first voltage V1, the third voltage V3 and the fourth voltage V4 may be in a range of 10 Volts to 15 Volts and the second voltage V2 may be in a range of 5 Volts to 7.5 Volts, but not limited thereto. In other words, the liquid crystal layer 14 is mainly driven by the vertical electric field E2 formed between the second electrode 32 and the third patterned electrode 33 and between the second electrode 32 and the fourth patterned electrode 34. And because the liquid crystal layer 14 is a positive type liquid crystal layer, its alignment direction is parallel to the direction of the vertical electric field E2 and thus the liquid crystal layer 14 is aligned vertically. Therefore, no phase retardation effect occurs in the liquid crystal layer 14. Because the first polarization axis 16P is substantially perpendicular to the second polarization axis 18P, the polarized light passing through the first polarizer 16 is blocked by the second polarizer 18. As a result, under the dark state display mode, the viewer cannot see the background behind the tri-state liquid crystal display panel 106.

As shown in FIG. 20, under the haze state display mode, the first voltage V1, the second voltage V2, the third voltage V3 and the fourth voltage V4 are substantially equal. For example, the first voltage V1, the second voltage V2, the third voltage V3 and the fourth voltage V4 may all be 0 Volts or all be 5 Volts, but not limited thereto. In this situation, because the liquid crystal layer 14 is restricted by the polymer network structure, the alignment of the polymer network liquid crystals of the liquid crystal layer 14 is arranged randomly in the horizontals as shown in FIG. 20 when there is no vertical electric field and horizontal electric field, and the tri-state liquid crystal display panel 106 in this embodiment presents multiple-region haze visual effects. As a result, under the haze state display mode, the viewer cannot clearly recognize but only roughly sees the background behind the tri-state liquid crystal display panel 106.

Figure 21:
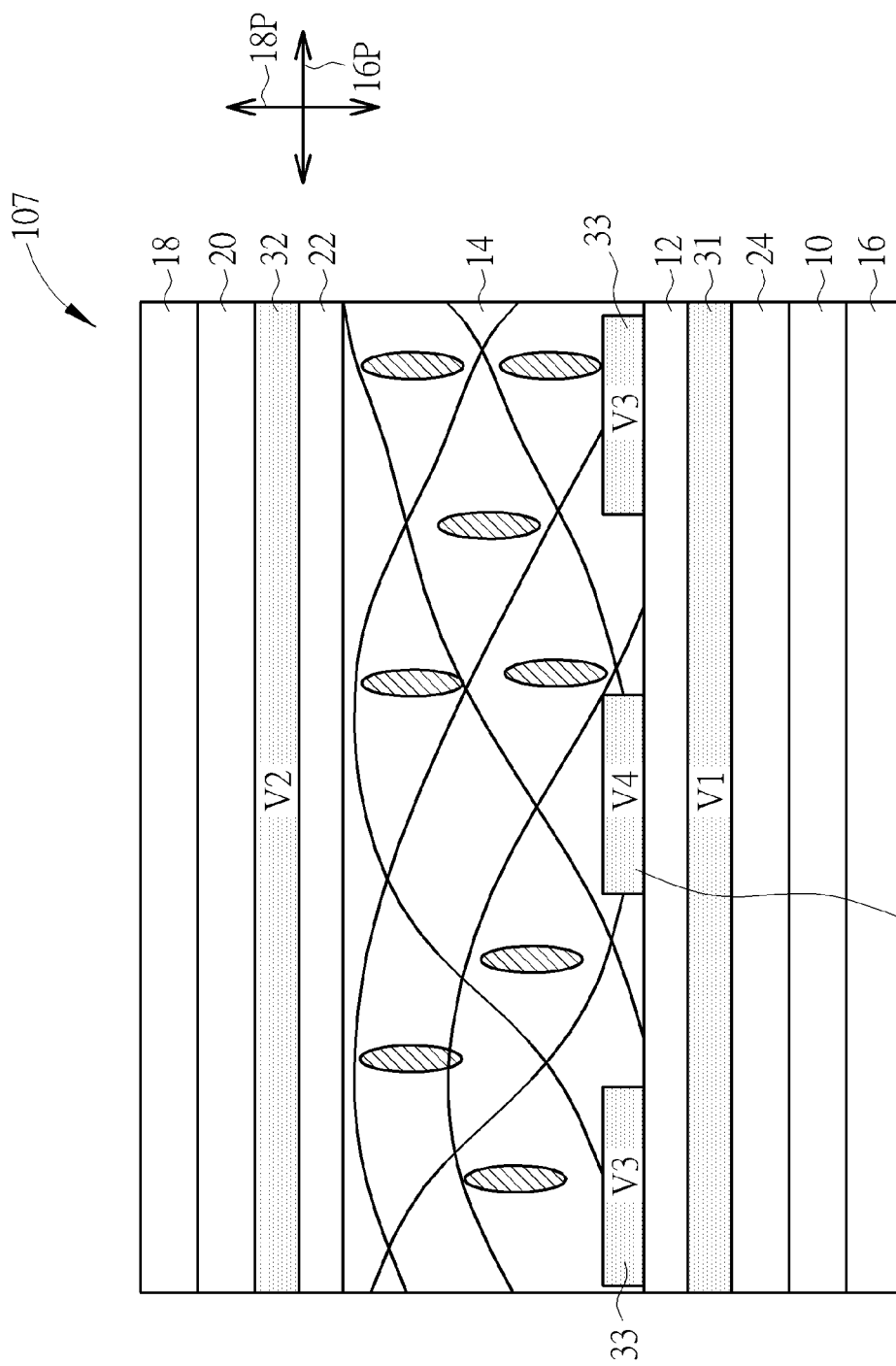
FIG. 21 is a schematic diagram illustrating a tri-state liquid crystal display panel under the transmission state display mode according to a seventh embodiment of the present disclosure.
Figure 22:
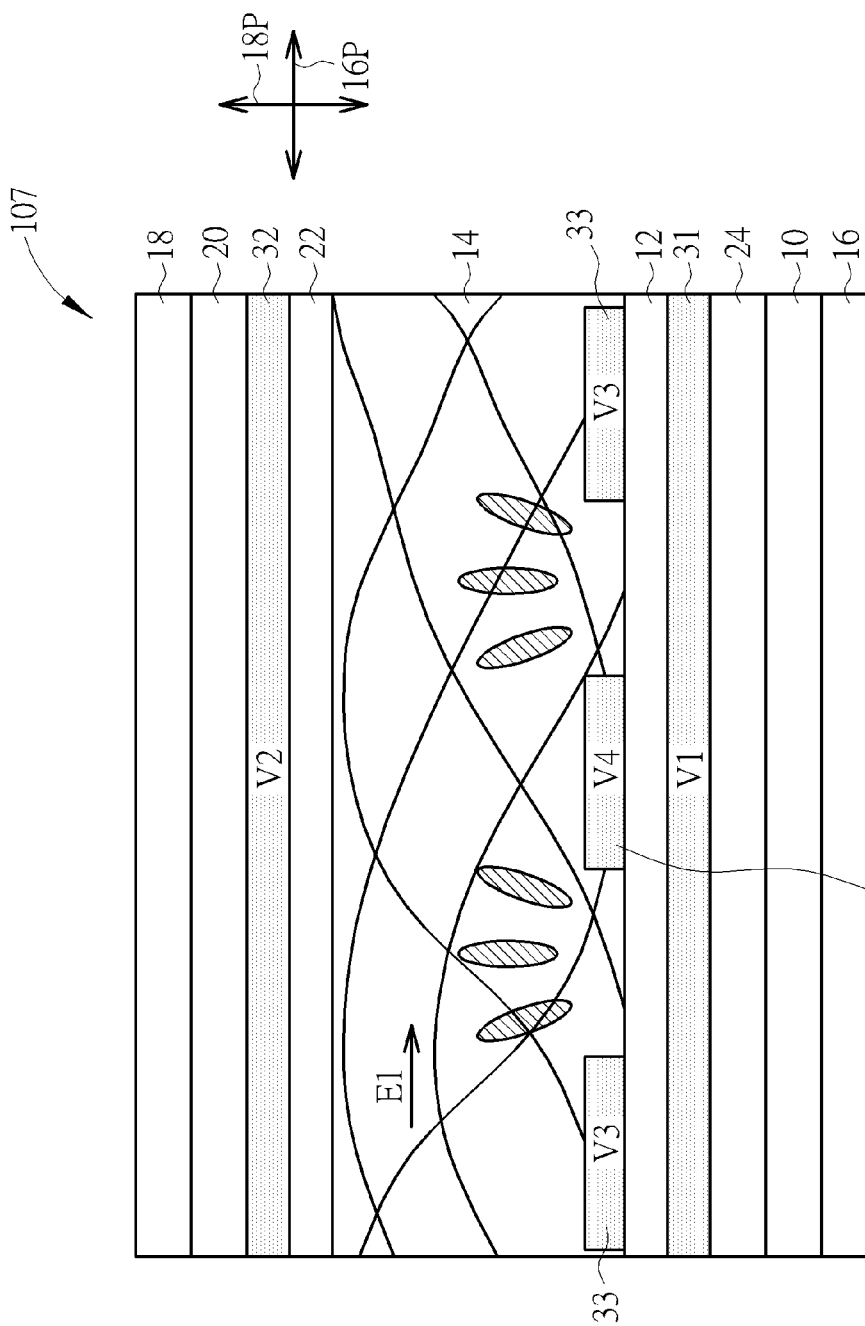
FIG. 22 is a schematic diagram illustrating the tri-state liquid crystal display panel under the dark state display mode according to the seventh embodiment of the present disclosure.
Figure 23:
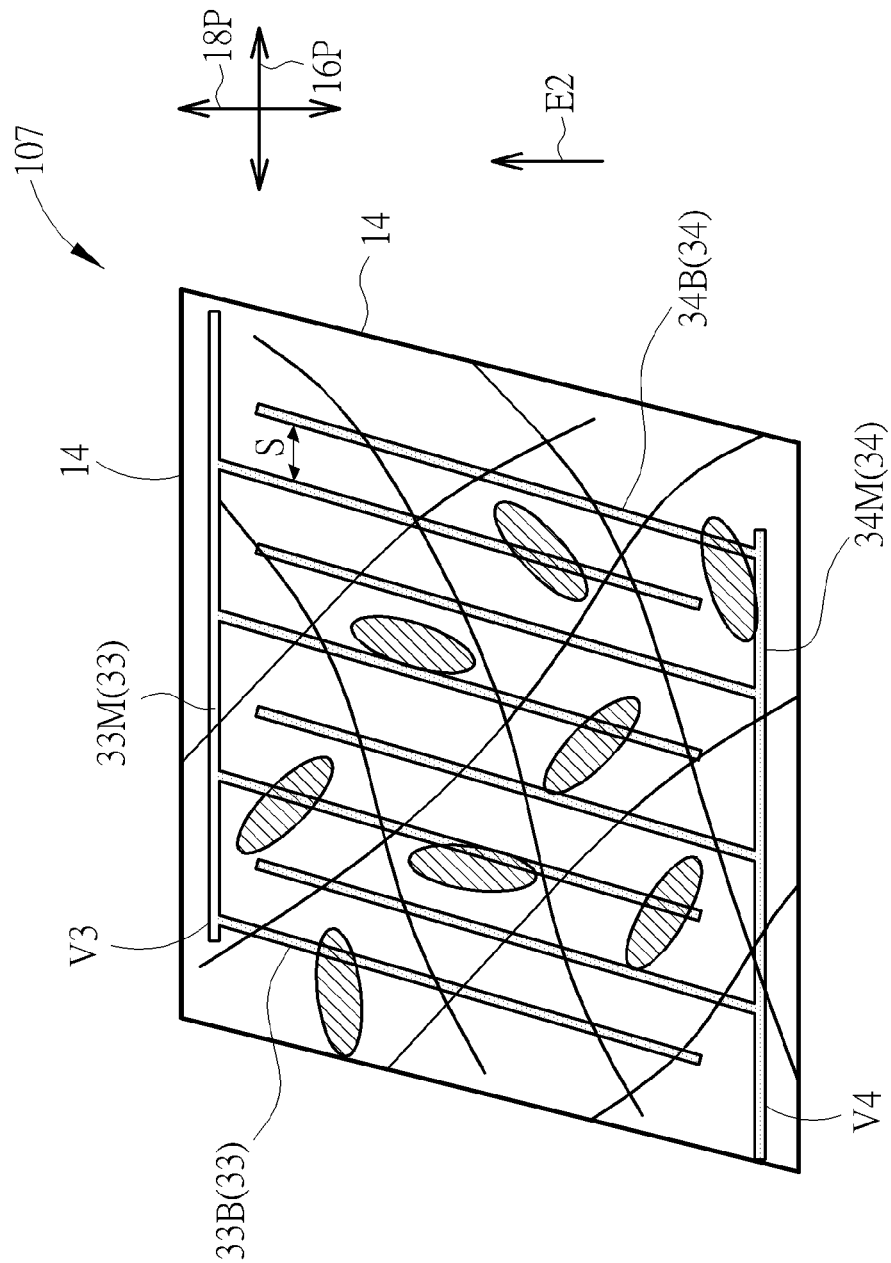
FIG. 23 is a schematic diagram illustrating the tri-state liquid crystal display panel under the haze state display mode according to the seventh embodiment of the present disclosure.

Please refer to FIGS. 21-23, and also refer to FIG. 1. FIG. 21 is a schematic diagram illustrating a tri-state liquid crystal display panel under the transmission state display mode according to a seventh embodiment of the present disclosure. FIG. 22 is a schematic diagram illustrating the tri-state liquid crystal display panel under the dark state display mode according to the seventh embodiment of the present disclosure. FIG. 23 is a schematic diagram illustrating the tri-state liquid crystal display panel under the haze state display mode according to the seventh embodiment of the present disclosure. In this embodiment, the liquid crystal layer 14 comprises a negative type liquid crystal layer. The first polarization axis 16P is substantially perpendicular to the second polarization axis 18P. The tri-state liquid crystal display panel 107 further comprises a half-wave plate 24 disposed between the first polarizer 16 and the first electrode 31. As shown in FIG. 21, under the transmission state display mode, the first voltage V1, the second voltage V2, the third voltage V3 and the fourth voltage V4 are substantially equal. For example, the first voltage V1, the second voltage V2, the third voltage V3 and the fourth voltage V4 may all be 0 Volts or all be 5 Volts, but not limited thereto. In this situation, the liquid crystal layer 14 is under a vertical aligning force and tends to align vertically without vertical electric fields and horizontal electric fields. Therefore, no phase retardation effect occurs in the liquid crystal layer 14. In this condition, after penetrating the half-wave plate 24, the polarization vector of polarized light passing through the first polarizer 16 is rotated by 90 degrees. Accordingly, the polarized light can pass through the second polarizer 18. As a result, under the transmission state display mode, the viewer can see the background behind the tri-state liquid crystal display panel 107.

As shown in FIG. 22, under the dark state display mode and during the positive half cycle in this embodiment, the first voltage V1 substantially equals the second voltage V2. The third voltage V3 is higher than the first voltage V1 and the second voltage V2. The fourth voltage V4 is lower than the first voltage V1 and the second voltage V2. For example, the first voltage V1 and the second voltage V2 may both be 5 Volts, the third voltage V3 may be 10 Volts and the fourth voltage V4 may be 0 Volts, but not limited thereto. The liquid crystal layer 14 is mainly driven by the horizontal electric field E1 formed from the voltage difference between the third voltage V3 and the fourth voltage V4. And because the liquid crystal layer 14 is a negative type liquid crystal layer, its alignment direction is perpendicular to the direction of the horizontal electric field E1. Moreover, the magnitude of the horizontal electric field E1 in the positions close to the third patterned electrode 33 or the fourth patterned electrode 34 is larger than the magnitude of the horizontal electric field E1 in the positions far from the third patterned electrode 33 or the fourth patterned electrode 34. Therefore, the alignment of the polymer network liquid crystals of the liquid crystal layer 14 is shown as FIG. 22 and it acts as a role of half wave plate. In this condition, after penetrating the half-wave plate 24, the polarization vector of polarized light passing through the first polarizer 16 is rotated by 90 degrees. After penetrating the liquid crystal layer 14, the polarization vector of the polarized light passing through the half-wave plate 24 is further rotated by 90 degrees. Accordingly, the polarized light is blocked by the second polarizer 18. As a result, under the dark state display mode, the viewer cannot see the background behind the tri-state liquid crystal display panel 107.

As shown in FIGS. 1 and 23, under the haze state display mode and during a positive half cycle, the first voltage V1, the third voltage V3 and the fourth voltage V4 are substantially equal. The second voltage V2 is lower than the first voltage V1, the third voltage V3 and the fourth voltage V4. For example, the first voltage V1, the third voltage V3 and the fourth voltage V4 may be in a range of 10 Volts to 15 Volts and the second voltage V2 may be in a range of 5 Volts to 7.5 Volts, but not limited thereto. In other words, the liquid crystal layer 14 is mainly driven by the vertical electric field E2 formed between the second electrode 32 and the third patterned electrode 33 and between the second electrode 32 and the fourth patterned electrode 34. And because the liquid crystal layer 14 is a negative type liquid crystal layer, its alignment direction is perpendicular to the direction of the vertical electric field E2. Therefore, the alignment of the polymer network liquid crystals of the liquid crystal layer 14 is arranged randomly in the horizontals as shown in FIG. 23, and the tri-state liquid crystal display panel 107 in this embodiment presents haze state in multi-region. Asa result, under the haze state display mode, the viewer cannot clearly recognize but only roughly sees the background behind the tri-state liquid crystal display panel 107.

Figure 24:
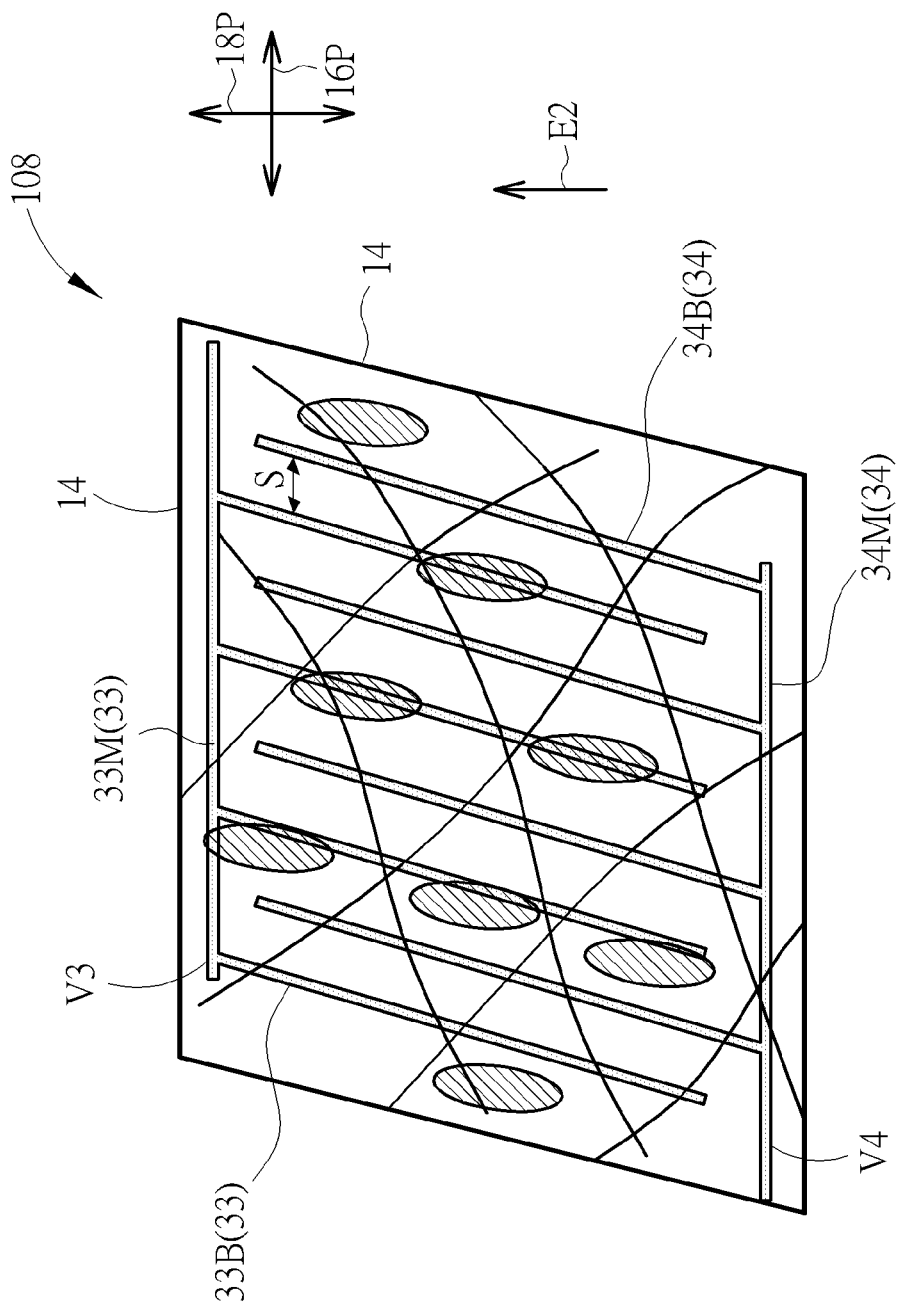
FIG. 24 is a schematic diagram illustrating a tri-state liquid crystal display panel under the transmission state display mode according to an eighth embodiment of the present disclosure.
Figure 25:
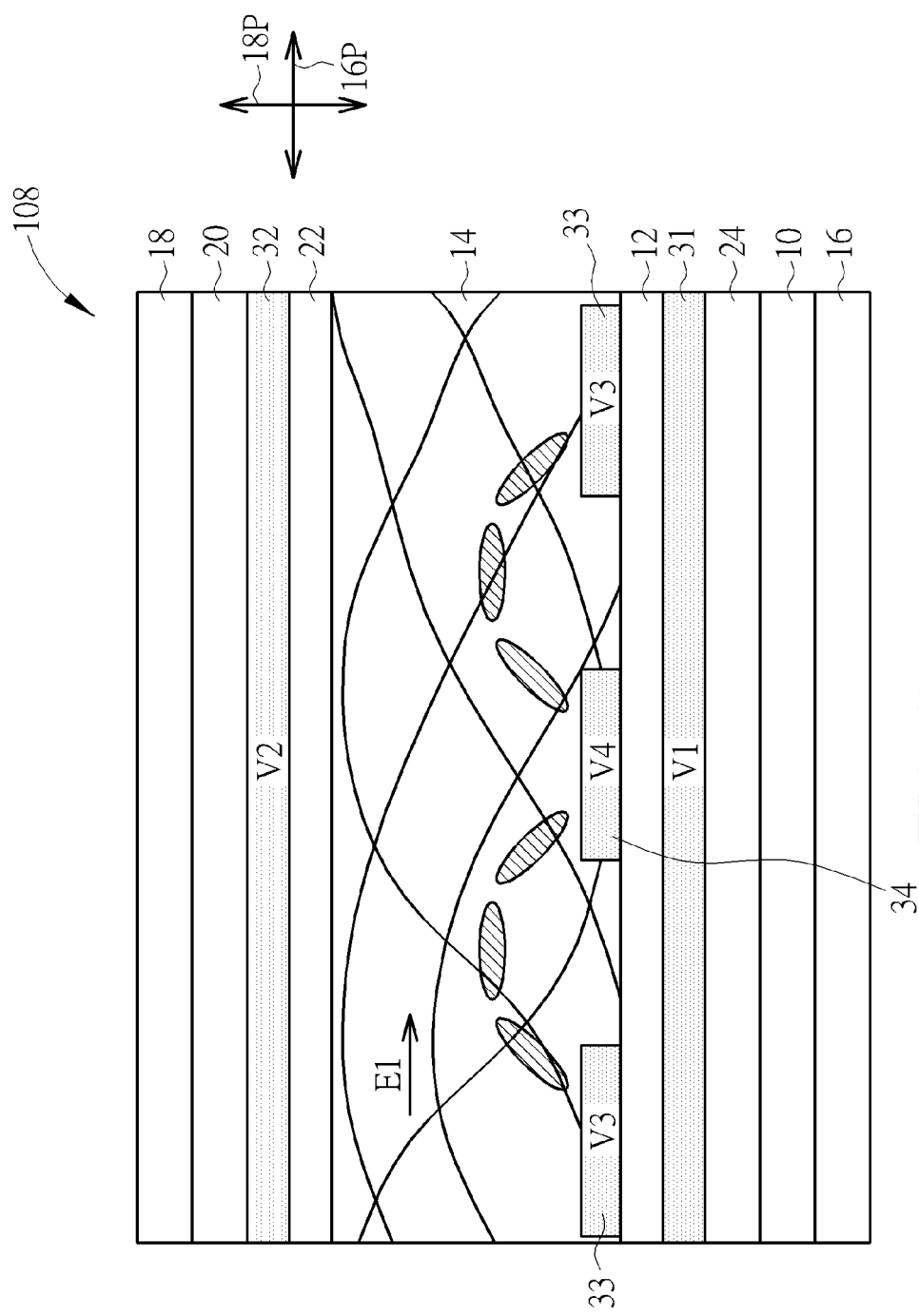
FIG. 25 is a schematic diagram illustrating the tri-state liquid crystal display panel under the dark state display mode according to the eighth embodiment of the present disclosure.
Figure 26:
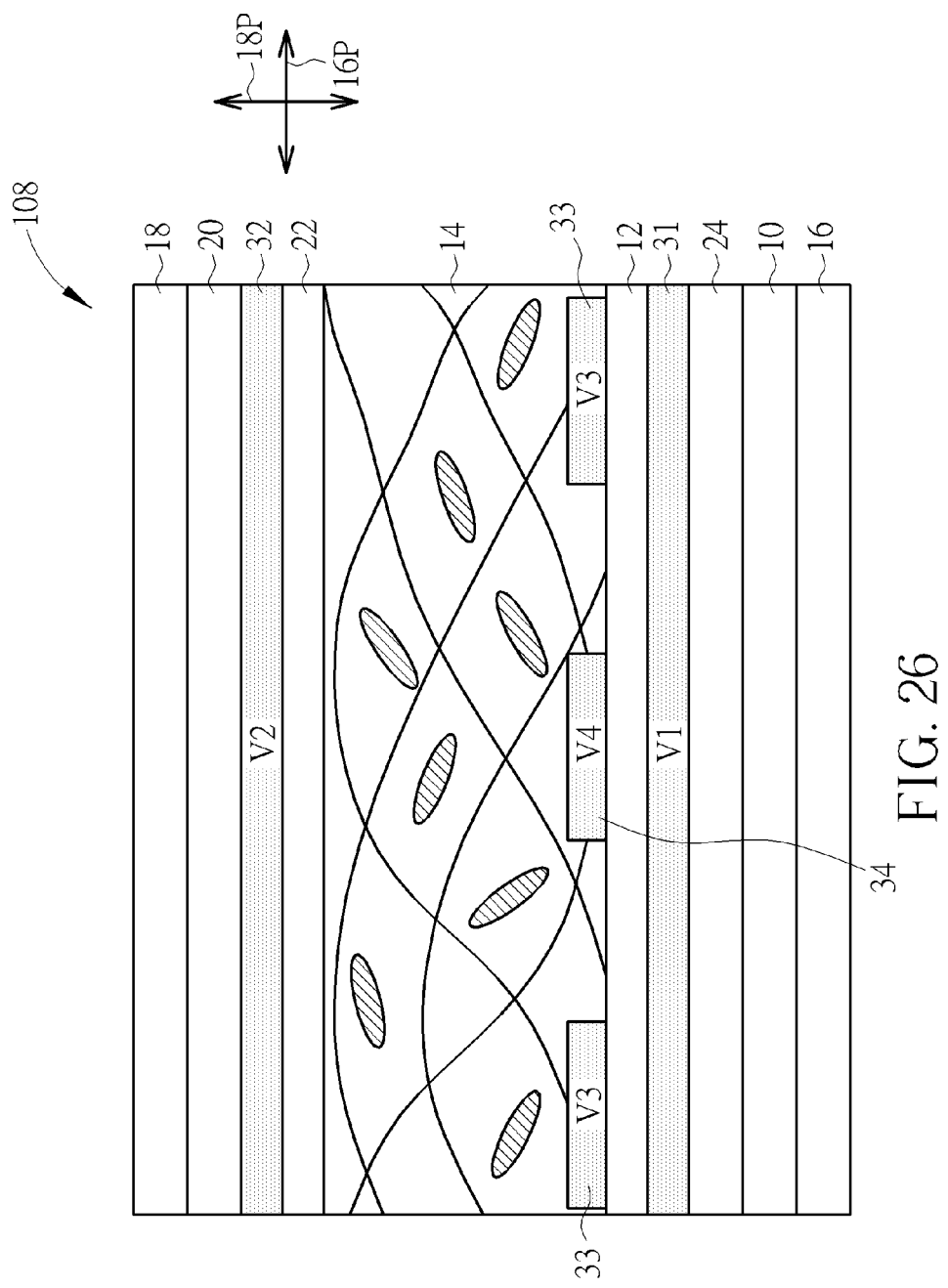
FIG. 26 is a schematic diagram illustrating the tri-state liquid crystal display panel under the haze state display mode according to the eighth embodiment of the present disclosure.

Please refer to FIGS. 24-26, and also refer to FIG. 1. FIG. 24 is a schematic diagram illustrating a tri-state liquid crystal display panel under the transmission state display mode according to an eighth embodiment of the present disclosure. FIG. 25 is a schematic diagram illustrating the tri-state liquid crystal display panel under the dark state display mode according to the eighth embodiment of the present disclosure. FIG. 26 is a schematic diagram illustrating the tri-state liquid crystal display panel under the haze state display mode according to the eighth embodiment of the present disclosure. In this embodiment, the liquid crystal layer 14 comprises a positive type liquid crystal layer. The first polarization axis 16P is substantially perpendicular to the second polarization axis 18P. The tri-state liquid crystal display panel 108 further comprises a half-wave plate 24 disposed between the first polarizer 16 and the first electrode 31. As shown in FIGS. 1 and 24, under the transmission state display mode and during a positive half cycle, the first voltage V1, the third voltage V3 and the fourth voltage V4 are substantially equal. The second voltage V2 is lower than the first voltage V1, the third voltage V3 and the fourth voltage V4. For example, the first voltage V1, the third voltage V3 and the fourth voltage V4 may be in a range of 10 Volts to 15 Volts, such as 10 Volts, and the second voltage V2 may be in a range of 5 Volts to 7.5 Volts, such as 5 Volts, but not limited thereto. The liquid crystal layer 14 is mainly driven by the vertical electric field E2 formed between the second electrode 32 and the third patterned electrode 33 and between the second electrode 32 and the fourth patterned electrode 34. And because the liquid crystal layer 14 is a positive type liquid crystal layer, its alignment direction is parallel to the direction of the vertical electric field E2 and thus the liquid crystal layer 14 is aligned vertically. Therefore, no phase retardation effect occurs in the liquid crystal layer 14. In this condition, after penetrating the half-wave plate 24, the polarization vector of polarized light passing through the first polarizer 16 is rotated by 90 degrees. Accordingly, the polarized light can pass through the second polarizer 18. As a result, under the transmission state display mode, the viewer can see the background behind the tri-state liquid crystal display panel 108.

As shown in FIG. 25, under the dark state display mode and during the positive half cycle in this embodiment, the first voltage V1 substantially equals the second voltage V2. The third voltage V3 is higher than the first voltage V1 and the second voltage V2. The fourth voltage V4 is lower than the first voltage V1 and the second voltage V2. For example, the first voltage V1 and the second voltage V2 may both be 5 Volts, the third voltage V3 may be 10 Volts and the fourth voltage V4 may be 0 Volts, but not limited thereto. The liquid crystal layer 14 is mainly driven by the horizontal electric field E1 formed from the voltage difference between the third voltage V3 and the fourth voltage V4. And because the liquid crystal layer 14 is a positive type liquid crystal layer, its alignment direction is parallel to the direction of the horizontal electric field E1. Moreover, the magnitude of the horizontal electric field E1 in the positions close to the third patterned electrode 33 or the fourth patterned electrode 34 is larger than the magnitude of the horizontal electric field E1 in the positions far from the third patterned electrode 33 or the fourth patterned electrode 34. Therefore, the alignment of the polymer network liquid crystals of the liquid crystal layer 14 is shown as FIG. 25 and it acts as a role of half wave plate. In this condition, after penetrating the half-wave plate 24, the polarization vector of polarized light passing through the first polarizer 16 is rotated by 90 degrees. After penetrating the liquid crystal layer 14, the polarization vector of the polarized light passing through the half-wave plate 24 is further rotated by 90 degrees. Accordingly, the polarized light is blocked by the second polarizer 18. As a result, under the dark state display mode, the viewer cannot see the background behind the tri-state liquid crystal display panel 108.

As shown in FIG. 26, under the haze state display mode, the first voltage V1, the second voltage V2, the third voltage V3 and the fourth voltage V4 are substantially equal. For example, the first voltage V1, the second voltage V2, the third voltage V3 and the fourth voltage V4 may all be 0 Volts or all be 5 Volts, but not limited thereto. In this situation, because the liquid crystal layer 14 is restricted by the polymer network structure, the alignment of the polymer network liquid crystals of the liquid crystal layer 14 is arranged randomly in the horizontals as shown in FIG. 26 when there is no vertical electric fields and horizontal electric fields, and the tri-state liquid crystal display panel 108 in this embodiment presents multiple-region haze visual effects in different viewing angles. As a result, under the haze state display mode, the viewer cannot clearly recognize but only roughly sees the background behind the tri-state liquid crystal display panel 108.

To sum up, the tri-state liquid crystal display panel in the present disclosure is a single liquid crystal display panel. With polymer network liquid crystals and four independently-controllable electrodes, three display modes, which are the transmission state display mode, the dark state display mode and the haze state display mode, are provided alternatively with horizontal electric fields or vertical electric fields or without any electric field, thereby significantly expanding the applications of the liquid crystal display panel. Because the first electrode, the second electrode, the third patterned electrode and the fourth patterned electrode are independently controlled, the tri-state liquid crystal display panel of the present disclosure can provide two or three display modes at the same time. For example, the transmission state display mode is partially provided, the dark state display mode is partially provided and the haze state display mode is partially provided to raise the application possibility. For example, as a portion of the pixels is under the transmission state display mode and a portion of the pixels is under the dark state display mode, the tri-state liquid crystal display panel in the present disclosure presents the desired visual information.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A tri-state liquid crystal display panel, comprising:
   a first substrate;
   an insulation layer, disposed on the first substrate;
   a second substrate, disposed to face the first substrate;
   a liquid crystal layer, disposed between the first substrate and the second substrate;
   a first polarizer, disposed on the first substrate, wherein the first polarizer has a first polarization axis;
   a second polarizer, disposed on the second substrate, wherein the second polarizer has a second polarization axis;
   a first electrode, disposed between the first substrate and the insulation layer, wherein the first electrode receives a first voltage;
   a second electrode, disposed between the second substrate and the liquid crystal layer, wherein the second electrode receives a second voltage;
   a third patterned electrode, disposed between the insulation layer and the liquid crystal layer, wherein the third patterned electrode receives a third voltage;
   a fourth patterned electrode, disposed between the insulation layer and the liquid crystal layer, wherein the fourth patterned electrode receives a fourth voltage;
   a first active switching device connecting to a first data line and the first electrode, and providing the first voltage to the first electrode;
   a second active switching device connecting to a second data line and the third patterned electrode, and providing the third voltage to the third patterned electrode; and
   a third active switching device connecting to a third data line and the fourth electrode, and providing the third patterned voltage to the fourth patterned electrode;
   wherein the tri-state liquid crystal display panel provides a first display mode, a second display mode, and a third display mode by manipulating the first voltage, the second voltage, the third voltage, and the fourth voltage independently.

2. The tri-state liquid crystal display panel according to claim 1, wherein the third patterned electrode is a comb-shaped electrode and comprises:
   a first main electrode; and
   a plurality of first branch electrodes, connected to a side of the first main electrode.

3. The tri-state liquid crystal display panel according to claim 2, wherein the fourth patterned electrode is a comb-shaped electrode and comprises:
   a second main electrode; and
   a plurality of second branch electrodes, connected to a side of the second main electrode, wherein the first branch electrodes of the third electrode and the second branch electrodes of the fourth electrode are alternately arranged.

4. The tri-state liquid crystal display panel according to claim 1, wherein the first polarization axis is substantially parallel to the second polarization axis.

5. The tri-state liquid crystal display panel according to claim 4, wherein the liquid crystal layer comprises a negative type liquid crystal layer, the first electrode has the first voltage when displaying, the second electrode has the second voltage when displaying, the third electrode has the third voltage when displaying, and the fourth patterned electrode has the fourth voltage when displaying, wherein:
   under the transmission state display mode, the first voltage, the second voltage, the third voltage and the fourth voltage are substantially equal;
   under the dark state display mode and during a positive half cycle, the first voltage substantially equals the second voltage, the third voltage is higher than the first voltage and the second voltage, and the fourth voltage is lower than the first voltage and the second voltage; and
   under the haze state display mode and during a positive half cycle, the first voltage, the third voltage and the fourth voltage are substantially equal, the second voltage is lower than the first voltage, the third voltage and the fourth voltage.

6. The tri-state liquid crystal display panel according to claim 4, wherein the liquid crystal layer comprises a positive type liquid crystal layer, the first electrode has the first voltage when displaying, the second electrode has the second voltage when displaying, the third electrode has the third voltage when displaying, and the fourth electrode has the fourth voltage when displaying, wherein:
   under the transmission state display mode and during a positive half cycle, the first voltage, the third voltage and the fourth voltage are substantially equal, the second voltage is lower than the first voltage, the third voltage and the fourth voltage;
   under the dark state display mode and during a positive half cycle, the first voltage substantially equals the second voltage, the third voltage is higher than the first voltage and the second voltage, and the fourth voltage is lower than the first voltage and the second voltage; and
   under the haze state display mode, the first voltage, the second voltage, the third voltage and the fourth voltage are substantially equal.

7. The tri-state liquid crystal display panel according to claim 4, further comprising a half-wave plate disposed between the first polarizer and the first electrode, wherein the liquid crystal layer comprises a negative type liquid crystal layer, the first electrode has the first voltage when displaying, the second electrode has the second voltage when displaying, the third electrode has the third voltage when displaying, and the fourth electrode has the fourth voltage when displaying, wherein:
   under the transmission state display mode and during a positive half cycle, the first voltage substantially equals the second voltage, the third voltage is higher than the first voltage and the second voltage, and the fourth voltage is lower than the first voltage and the second voltage;
   under the dark state display mode, the first voltage, the second voltage, the third voltage and the fourth voltage are substantially equal; and
   under the haze state display mode and during a positive half cycle, the first voltage, the third voltage and the fourth voltage are substantially equal, the second voltage is lower than the first voltage, the third voltage and the fourth voltage.

8. The tri-state liquid crystal display panel according to claim 4, further comprising a half-wave plate disposed between the first polarizer and the first electrode, wherein the liquid crystal layer comprises a positive type liquid crystal layer, the first electrode has the first voltage when displaying, the second electrode has the second voltage when displaying, the third electrode has the third voltage when displaying, and the fourth electrode has the fourth voltage when displaying, wherein:
   under the transmission state display mode and during a positive half cycle, the first voltage substantially equals the second voltage, the third voltage is higher than the first voltage and the second voltage, and the fourth voltage is lower than the first voltage and the second voltage;

under the dark state display mode and during a positive half cycle, the first voltage, the third voltage and the fourth voltage are substantially equal, the second voltage is lower than the first voltage, the third voltage and the fourth voltage; and under the haze state display mode, the first voltage, the second voltage, the third voltage and the fourth voltage are substantially equal.

9. The tri-state liquid crystal display panel according to claim 1, wherein the first polarization axis is substantially perpendicular to the second polarization axis.

10. The tri-state liquid crystal display panel according to claim 9, wherein the liquid crystal layer comprises a negative type liquid crystal layer, the first electrode has the first voltage when displaying, the second electrode has the second voltage when displaying, the third electrode has the third voltage when displaying, and the fourth electrode has the fourth voltage when displaying, wherein:

under the transmission state display mode and during a positive half cycle, the first voltage substantially equals the second voltage, the third voltage is higher than the first voltage and the second voltage, and the fourth voltage is lower than the first voltage and the second voltage;

under the dark state display mode, the first voltage, the second voltage, the third voltage and the fourth voltage are substantially equal; and under the haze state display mode and during a positive half cycle, the first voltage, the third voltage and the fourth voltage are substantially equal, the second voltage is lower than the first voltage, the third voltage and the fourth voltage.

11. The tri-state liquid crystal display panel according to claim 9, wherein the liquid crystal layer comprises a positive type liquid crystal layer, the first electrode has the first voltage when displaying, the second electrode has the second voltage when displaying, the third electrode has the third voltage when displaying, and the fourth electrode has the fourth voltage when displaying, wherein:

under the transmission state display mode and during a positive half cycle, the first voltage substantially equals the second voltage, the third voltage is higher than the first voltage and the second voltage, and the fourth voltage is lower than the first voltage and the second voltage;

under the dark state display mode and during a positive half cycle, the first voltage, the third voltage and the fourth voltage are substantially equal, the second voltage is lower than the first voltage, the third voltage and the fourth voltage; and under the haze state display mode, the first voltage, the second voltage, the third voltage and the fourth voltage are substantially equal.

12. The tri-state liquid crystal display panel according to claim 9, further comprising a half-wave plate disposed between the first polarizer and the first electrode, wherein the liquid crystal layer comprises a negative type liquid crystal layer, the first electrode has the first voltage when displaying, the second electrode has the second voltage when displaying, the third electrode has the third voltage when displaying, and the fourth electrode has the fourth voltage when displaying, wherein:

under the transmission state display mode, the first voltage, the second voltage, the third voltage and the fourth voltage are substantially equal;

under the dark state display mode and during a positive half cycle, the first voltage substantially equals the second voltage, the third voltage is higher than the first voltage and the second voltage, and the fourth voltage is lower than the first voltage and the second voltage; and under the haze state display mode and during a positive half cycle, the first voltage, the third voltage and the fourth voltage are substantially equal, the second voltage is lower than the first voltage, the third voltage and the fourth voltage.

13. The tri-state liquid crystal display panel according to claim 9, further comprising a half-wave plate disposed between the first polarizer and the first electrode, wherein the liquid crystal layer comprises a positive type liquid crystal layer, the first electrode has the first voltage when displaying, the second electrode has the second voltage when displaying, the third electrode has the third voltage when displaying, and the fourth electrode has the fourth voltage when displaying, wherein:

under the transmission state display mode and during a positive half cycle, the first voltage, the third voltage and the fourth voltage are substantially equal, the second voltage is lower than the first voltage, the third voltage and the fourth voltage;

under the dark state display mode and during a positive half cycle, the first voltage substantially equals the second voltage, the third voltage is higher than the first voltage and the second voltage, and the fourth voltage is lower than the first voltage and the second voltage; and under the haze state display mode, the first voltage, the second voltage, the third voltage and the fourth voltage are substantially equal.

14. The tri-state liquid crystal display panel according to claim 1, wherein the third electrode is electrically connected to a gate line via the second active switching device, and the fourth electrode is electrically connected to the gate line via the third active switching device.

* * * * *